United States Patent Office 3,711,507
Patented Jan. 16, 1973

3,711,507
1-[p-(2-AMINOETHYL)-PHENYL]-PYRROLES
Franz Ostermayer and Ulrich Renner, Riehen, Basel-Land, Switzerland, assignors to Ciba-Geigy Corporation, Ardsley, N.Y.
No Drawing. Filed Oct. 14, 1970, Ser. No. 80,783
Claims priority, application Switzerland, Oct. 17, 1969, 15,545/69
Int. Cl. C07d 27/24
U.S. Cl. 260—326.9      7 Claims

ABSTRACT OF THE DISCLOSURE

Compounds of the class of 1-[p-(2-aminoethyl)-phenyl]-pyrrole and the pharmaceutically acceptable acid addition salts thereof have analgesic, antiphlogistic and antipyretic effects; pharmaceutical compositions comprising these compounds and a pharmaceutical carrier are provided as well as methods for producing analgesic, antiphlogistic and antipyretic effects comprising administering them; a typical embodiment is 1-[4-(2-aminoethyl)-2-chlorphenyl]-pyrrole.

DETAILED DESCRIPTION

The present invention concerns new basic pyrrole derivatives and their pharmaceutically acceptable acid addition salts, pharmaceutical compositions containing such compounds and their use.

More particularly, the present invention concerns compounds of the Formula I

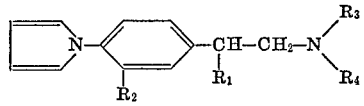

(I)

wherein
$R_1$ is hydrogen, methyl or ethyl,
$R_2$ is hydrogen or chloro; and
$R_3$ and $R_4$ independently of each other are hydrogen, methyl or ethyl;
and the pharmacetuically acceptable acid addition salts thereof.

As has now been found, these new substances have valuable pharmacological properties, in particular mild (i.e. non-narcotic) analgesic, antiphlogistic and antipyretic effects with a favorable therapeutic index, especially a good gastro-intestinal tolerance. The analgestic activity of the new compounds of Formula I, in particular of:

1-[p-[2(dimethylamino)-ethyl]-phenyl]-pyrrole;
1-[p-(2-amino-1-methylethyl)-phenyl]-pyrrole,
1-[p-(2-aminoethyl)-phenyl]-pyrrole; and
1-[p-[1-(methylamino-methyl)-propyl]-phenyl]-pyrrole, can be shown, for example, on the mouse using the method described by E. Siegmund, R. Cadmus and G. Lu, Proc. Soc. Exp. Biol. Med. 95, 729 (1957), whereby the amount of substance is determined which is required to prevent the syndrome produced by the intraperitoneal injection of 2-phenyl-1,4-benzoquinone, as well as according to L. O. Randall and J. J. Selitto, Arch. intern. pharmacodyn. 111, 409 (1957), by the delay of the pain reaction time when pressure is applied to a rat's paw which is inflamed due to an injection of yeast. The antipholgistic activity of the new compounds of the Formula I, in particular of:

1-[p-(2-aminoethyl)-phenyl]-pyrrole
1-[p-[1-methyl-2-(methylamino)-ethyl]-phenyl]-pyrrole, and
1-[4-(2-aminoethyl)-2-chlorophenyl]-pyrrole, is, for example, demonstrated on guinea-pigs in the UV-erythema test, described by G. Wilhelmi, Schweiz. Med. Wochenschrift 79, 577 (1949), and also on rats in the bolus alba-edema test, according to G. Wilhelmi, Jap. J. Pharmacol. 15, 187 (1965). The antipyretic activity of the new compounds of the Formula I, in particular of 1-[p-(2-aminoethyl)-phenyl]-pyrrole;
1-[p-[2-(dimethylamino)-ethyl]-phenyl]-pyrrole;
1-[4-(2-aminoethyl)-2-chlorophenyl]-pyrrole;
1-[p-(2-amino-1-methylethyl)-phenyl]-pyrrole; and
1-[p-[1-methyl-2-(methylamino)-ethyl]-phenyl]-pyrrole can be demonstrated, for example, on the rat in the "yeast-fever" test by subcutaneous injection of a 15% yeast suspension followed by the oral administration of the test substance in 2% gum arabic. The rectal temperature is then measured hourly for 3 hours and the maximum and minimum teperature differences are noted.

In the above descriped tests the compounds of the present invention, in particular the hydrochlorides of the above named species, were found to exhibit mild analgesic, antiphlogistic and antipyretic activities upon oral administration in amounts of between about 2.5 and 100 mg./kg.

The new basic pyrrole derivative of Formula I and their pharmaceutically acceptable acid addition salts are suitable as active substances for medicaments which can be administered orally, rectally or parenterally for the relief and removal of pains of varying origin and of light and medium severity and for the treatment of rheumatic, arthritic and other inflammatory diseases.

The compounds of Formula I and their acid addition salts are produced by reducing a compound of the Formula II

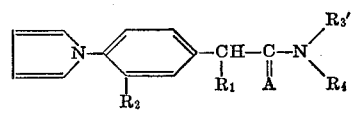

(II)

wherein
A represents an oxo radical and at the same time $R_3'$ corresponds to the definition given for $R_3$, or
A represents two hydrogen atoms and at the same $R_3'$ represents an acetyl or formyl radical or a lower alkoxy-carbonyl group and
$R_1$, $R_2$ and $R_4$ in both cases have the meanings given under Formula I, by means of a complex hydride and optionally converting the resultant compound of General Formula I into an acid addition salt thereof. The reduction of the compounds of General Formula II can be performed, for example, with lithium aluminum hydride or diborane in an ether-type solvent such as diethyl ether, tetrahydrofuran, dibutyl ether, ethylene glycol dimethyl ether (1,2-dimethoxyethane) or di-ethylene glycol dimethyl ether, or with bis-(2-methoxyethyl) sodium dihydrogen aluminate in benzene or toluene, at temperatures between about 0° and 100°, or at the boiling temperature of the solvent employed. The diborane is prepared separately either preceding or during the reduction and then introduced, or it is formed in situ, e.g. from sodium or potassium boron hydride and boron trifluoride-etherate. The production of the starting materials of Formula II which in themselves are new will be described further below.

The compounds of General Formula I and their acid addition salts are produced by a second process by reacting a reactive ester of an alcohol of the General Formula III

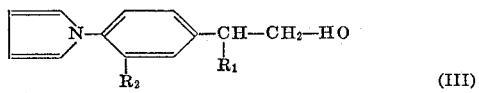
(III)

with a compound of the General Formula IV

(VI)

wherein $R_1$, $R_2$, $R_3$ and $R_4$ have the meanings given under Formula I, and optionally converting the resultant compound of General Formula I into an acid addition salt thereof. Suitable as reactive esters of alcohols of General Formula III are, for example, hydrohalic acid esters, in particular bromides, furthermore chlorides or iodides, as well as sulphonic acid esters, in particular arene-sulphonic acid esters or lower alkane-sulphonic acid esters such as p-toluene-sulphonic acid esters and methane-sulphonic acid esters. The reactions are performed preferably in a suitable organic medium, e.g. in an aromatic hydrocarbon such as benzene, toluene or xylene, in a lower alkanol or another aliphatic hydroxy compound such as methanol, ethanol, n-butanol, 2-methoxy-ethanol, in a ketone such as acetone or 2-butanone, or in an ether-type liquid such as dibutyl ether, ethylene- or diethylene-glycol dimethyl ether, tetrahydrofuran or dioxane and/or an excess of the compound of General Formula IV to be reacted. An excess of the compound of General Formula IV can at the same time serve as acid-binding agent; however, tertiary organic bases such as, e.g. diisopropyl ethyl amine, pyridine or symmetrical collidine, or inorganic basic substances such as, e.g. potassium carbonate can also be employed as acid-binding agents. The reactions are performed at room temperature or at raised temperatures up to about 180°, preferably between about 90° and 130° C. and if necessary in a closed vessel. The alcohols of General Formula III and their reactive esters are in turn new compounds, the preparation of which will be described further below.

The compounds of General Formula I in which $R_3$ and $R_4$ represent hydrogen atoms, and their acid addition salts, are obtained according to a third process by reducing a nitrile of the General Formula V

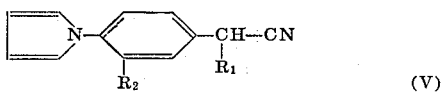
(V)

wherein $R_1$ and $R_2$ have the meaning given for Formula I, and optionally converting the resultant compound of General Formula I into an acid addition salt thereof. The reduction takes place, for example using hydrogen in the presence of a hydrogenation catalyst such as, e.g., Raney nickel, in an organic solvent such as, e.g., methanol, at raised temperature and raised pressure, e.g. at 50–100° C. and about 100–200 atm., and preferably in the presence of ammonia or by means of a complex hydride such as e.g. diborane in tetrahydrofuran. Of the nitriles of General Formula V [p-(1-pyrrolyl)-phenyl]-acetonitrile is described in French Pat. No. 1,543,100. The other nitriles can be produced analogously.

Likewise, compounds of General Formula I having hydrogen atoms as $R_3$ and $R_4$, and their acid addition salts, are obtained according to a fourth process by reacting an N-substituted phthalimide of the General Formula VI

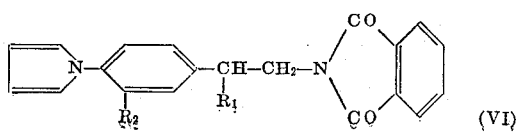
(VI)

wherein $R_1$ and $R_2$ have the meanings given under Formula I, with hydrazine, treating the reaction product with an acid and optionally converting the compound of General Formula I which has been liberated into an acid addition salt thereof. For example, a compound of General Formula VI is first boiled for several hours with hydrazine hydrate in ethanol, then dilute hydrochloric acid is added, and boiling is continued for about 10–30 minutes for cleavage of the phthalazinone derivative resulting as intermediate product. The starting materials of General Formula VI are obtained, for example, by reacting reactive esters of the alcohols defined above of General Formula III, with potassium phthalimide in known manner. The production of the alcohols of General Formula III and their reactive esters will be described further below.

Compounds of General Formula I in which $R_1$, $R_3$ and $R_4$ represent hydrogen atoms, and their acid addition salts, are produced according to a fifth process by reducing a compound of the General Formula VII

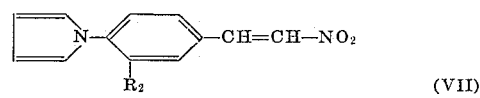
(VII)

wherein $R_2$ has the meaning given under Formula I, and optionally converting the resultant compound of General Formula I into an acid addition salt thereof. The reduction of compounds of General Formula VII takes place, for example, with complex hydrides such as lithium aluminium hydride or diborane under the conditions given for the first process, or by catalytic hydrogenation, e.g. in the presence of a palladium/charcoal catalyst, in a mixture of glacial acetic acid and hydrochloric acid. The production of the starting materials of General Formula VII will be described further below.

Compounds of General Formula I in which $R_4$ represents hydrogen, whereas $R_1$, $R_2$ and $R_3$ have the meanings given under Formula I, and their acid addition salts, are obtained according to a sixth process by hydrolyzing an amide of the General Formula VIII

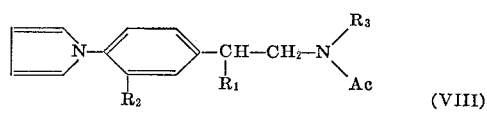
(VIII)

wherein

Ac represents the acyl radical of an organic acid, and $R_1$, $R_2$ and $R_3$ have the meanings given under Formula I, and optionally converting the compound of General Formula I which is set free, into an acid addition salt thereof. An acyl radical as Ac is derived, in particular, from a carboxylic acid, from a mono-functional carbonic acid derivative, or from a sulphonic acid, and is, for example, a lower alkanoyl radical, the benzoyl radical, a lower alkoxycarbonyl radical, the phenyloxycarbonyl radical or benzyloxycarbonyl radical, the cyano radical, a lower alkane-sulphonyl radical such as the methane-sulphonyl radical, or an arene-sulphonyl radical such as the p-toluene-sulphonyl radical. The hydrolysis is preferably performed in an alkaline medium e.g. by boiling for several hours with an alkali hydroxide such as sodium or potassium hydroxide in a preferably aqueous lower alkanol such as methanol, ethanol or n-butanol. Some of the starting materials of General Formula VIII, i.e. those having a lower alkanoyl group as acyl radical Ac, also fall under General Formula II. The production of these and other starting materials will be described further below.

Likewise, compounds of General Formula I having a hydrogen atom as $R_4$, as well as their acid addition salts, are obtained according to a seventh process by allowing catalytically activated hydrogen to react on a compound of the General Formula IX

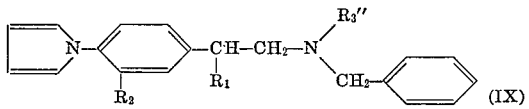

wherein

R₃″ represents a benzyl group or has the meaning shown for R₃ above and

R₁ and R₂ have the meanings given under Formula I, or on an acid addition salt of such a compound, until a substantially equimolar amount or double the molar amount, depending on the meaning of R₃″, is taken up, and optionally converting the resultant compound of General Formula I into an acid addition salt thereof or, conversely, setting free the base from a resultant salt. The hydrogenolytic cleavage of the benzyl group takes place, for example, by using noble metal catalysts, e.g. a palladium/charcoal catalyst, in a suitable organic solvent such as methanol, ethanol or dioxan, at normal or slightly raised pressure and normal or slightly raised temperature. The production of the starting materials of General Formula IX will be described further below.

Compounds of the General Formula I possessing a secondary or tertiary amino group and their acid addition salts are produced by an eighth process by reacting a compound of the General Formula X

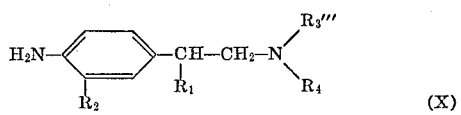

wherein

R₃‴ represents a methyl or ethyl group and

R₁, R₂ and R₄ have the meanings given under Formula I, with monomeric or polymeric succinaldehyde or with an open-chain or cyclic, reactive derivative of the monomeric succinaldehyde, and optionally converting the resultant compound of General Formula I into an acid addition salt thereof. The succinaldehyde is employed either in the monomeric form which is preferably prepared directly before the reaction either being set free from a functional derivative or obtained by distillation of polymeric forms, or it is employed in a polymeric modification [cf. C Harries, Ber. 35, 1183–1189 (1902)]. Functional derivatives of monomeric succinaldehyde which may be employed are in particular open-chain or cyclic acetals, acylals, α-halogeno ethers, enolic ethers or enolic esters corresponding to the General Formula XI

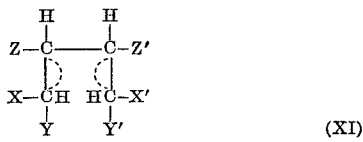

wherein

X and X' represent, independently of each other, chlorine or bromine atoms or groups of the formulae R—O— and R—CO—O—, wherein R represents an optionally halogen substituted hydrocarbon group, Y and Y' represent, independently of each other, groups of the formulae R—O and R—CO—O— as defined above for X and X', or, together the epoxy group (—O—), or Y' together with X', represents the oxo group (=O) and Z and Z' represent, independently of each other, hydrogen atoms or together with Y and Y' respectively additional bonds as indicated by the dotted lines, in the presence or absence of a diluting and/or condensing agent.

Of the compounds of General Formula XI which may be employed in place of succinaldehyde, the following examples of open-chain derivatives of monomeric succinaldehyde may be mentioned: the acetals thereof such as succinaldehyde-mono-diethyl acetal, -bis-dimethyl-acetal, -bis-diethyl acetal, acylals such as succinaldehyde-1,1-diacetate (4,4-diacetoxy-butyraldehyde), enolic ethers such as 1,4-diphenoxy-butadiene, enolic esters such as 1,4-diacetoxy-butadiene. Compounds of General Formula XI in which Y and Y' together form the epoxy radical are formally derivatives of tetrahydrofuran which, depending on the meaning of X and X', react like the acetals or acylals of succinaldehyde, or like open-chain α-halogeno ethers. Such compounds are e.g. 2,5-dialkoxy-tetrahydrofurans and related compounds such as 2,5-dimethoxy-, 2,5-diethoxy-, 2,5-dipropoxy-, 2,5-dibutoxy-, 2,5-bis-allyloxy-, 2,5-bis-(2-chloroethoxy)-, 2,5-diphenoxy- and 2,5-bis-(3,4-xylyloxy)-tetrahydrofuran, furthermore 2,5-diacyloxy-tetrahydrofurans such as 2,5-diacetoxytetrahydrofuran as well as 2,5-dihalogeno-tetrahydrofurans such as 2,5-dichloro-tetrahydrofuran and 2,5-dibromo-tetrahydrofuran, and finally also compounds which simultaneously belong to two classes such as 2-chloro-5-(2-chloroethoxy)-tetrahydrofuran and 2-allyloxy-5-chlorotetrahydrofuran.

As medium for the reaction according to the invention when succinaldehyde is employed, either as the free compound or formed in situ, any solvent desired can be used in which the succinaldehyde is soluble, for example methanol, aqueous dioxane or acetic acid.

Acetals and acylals of succinaldehyde as well as cyclic, acetal-type derivatives are advantageously reacted in acetic acid as solvent and condensing agent. The reaction of compounds of General Formula XI in which X and/or X' represent halogen atoms, is performed in an inert organic solvent such as chloroform, benzene or toluene. The reaction temperature is preferably between room temperature and the boiling point of the solvent or diluent employed, the lower range being especially suitable for the last-mentioned halogen compounds.

Compounds of General Formula I having a tertiary amino group and their acid addition salts are obtained according to a ninth process by reacting a compound of the General Formula XII

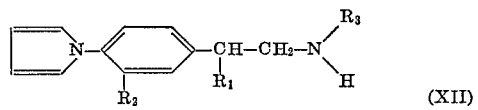

wherein R₁, R₂ and R₃ have the meanings given under Formula I, which compound of Formula XII is also embraced by Formula I, with a reactive ester of methanol or ethanol in a molar ratio corresponding at least to the number of hydrogen atoms bound to the nitrogen atom of the side chain, in the presence of an acid-binding agent, and optionally converting the resultant compound of General Formula I into an acid addition salt thereof.

As reactive esters of methanol and ethanol, halides, in particular bromides or iodides, as well as arenesulphonic acid esters or disulphates are employed. The reactions are performed for example in organic solvents such as acetonitrile, methanol or dimethylformamide, or also without solvent in the presence of an acid-binding agent such as sodium or potassium carbonate at room temperature or raised temperatures e.g. at the boiling point of the solvent employed.

The starting materials needed for the various processes can be produced by various reaction sequences. These may be divided into two groups, namely those which start with known compounds which already contain the p-(1-pyrrolyl) group and those in which during the course thereof this group is introduced by ring closure analogously to the eighth process for the production of compounds of General Formula I.

Belonging to the first group of methods of preparation is the reaction of lower alkyl esters of [p-(1-pyrrolyl)-phenyl]-acetic acids which may be substituted corresponding to the definition of $R_1$ and $R_2$ and which are described in French Pat. No. 1,543,100, or mixed anhydrides of the said acids, e.g. the anhydrides of the carboxylic acid-monoisobutyl esters or of pivalic acid, with ammonia or amines of General Formula IV to give amides of General Formula II wherein A represents the oxo radical. The aforesaid [p-(1-pyrrolyl)-phenyl]-acetic acids and their alkyl esters can also be reduced analogously to the amides of General Formula II with complex hydrides to obtain alcohols of General Formula III. These alcohols can be converted by conventional methods into their reactive esters, for example with p-toluene-sulphonyl chloride in absolute pyridine into their p-toluene-sulphonic acid esters.

By acylation of the primary amines falling under General Formula I obtained by the third process, with reactive functional derivatives of formic or acetic acid or with lower chloroformic acid alkyl esters, e.g. with acetanhydride or with ethyl chloroformate, and optionally by subsequent introduction of a methyl or ethyl group into the amide group, e.g. by conversion of the amides into their alkali metal compounds, e.g. sodium compounds, and reaction of the latter with reactive esters of methanol of General Formula II are obtained in which A represents two hydrogen atoms and $R_3'$ represents a formyl or acetyl radical or a lower alkoxycarbonyl group, and which at the same time can be employed as starting materials of General Formula VIII for the sixth process. Starting materials of General Formula IX are obtained for example analogously to the second process for the production of compounds of General Formula I when instead of compounds of General Formula IV, benzylamine, N-methyl- or N-ethylbenzylamines or dibenzylamine are employed or analogously to the first process, when instead of amides of General Formula II, the corresponding N-benzyl- or N,N-dibenzyl-amides, which can be prepared analogously, are used.

Some individual compounds of the starting materials of General Formula X have been described by K. Kindler and K. Schrader, Arch. Pharmazie 283, 184 (1950), and others can be produced analogously to the known compounds as well as by processes mentioned further below.

As has already been mentioned, ring closure analogous to the eighth process can be used for the production of starting materials for some of the other processes as well as for some intermediate products leading to such starting materials. For example, phenethyl halides, β-alkylphenethyl halides as well as N-phenethyl acetamides, N-(α-alkylphenethyl) acetamides, N-alkyl-N-phenethyl acetamides and N-alkyl-N-(α-alkylphenethyl) acetamides wherein the N- and α-alkyl groups are methyl or ethyl can be nitrated to the corresponding p-nitro compounds, which can be reduced, e.g. with tin and hydrochloric acid, to the corresponding amino compounds from which, by ring closure analogous to the eighth process, reactive esters, i.e. halides, of alcohols of General Formula III or amides of General Formula II having 2 hydrogen atoms as A and the acetyl group as $R_3'$ are obtained; said amides are also starting materials of General Formula VIII.

If the afore-mentioned p-nitro derivatives of phenethyl halides and β-alkyl phenethyl halides are first reacted with compounds of General Formula IV and then afterwards the nitro group is reduced, starting materials of General Formula X for the eighth process are obtained. Furthermore, nitriles of General Formula V can be obtained by condensing p-nitro-chlorobenzene with optionally methyl or ethyl-substituted cyanoacetic acid alkyl esters, or 2,4-dichloro-nitrobenzene with 2-cyano-propionic acid alkyl esters with the aid of alkali alcoholates, then hydrolyzing the condensation products with the equimolar amount of alkanolic/aqueous alkali hydroxide solutions, decarboxylating the resultant cyanoacetic acids, to 2-(p-nitrophenyl)-alkanoic acid nitriles or to 3-chloro-4-nitro-hydratropa-nitrile, reducing the nitro group in these nitriles to the amino group, e.g. again with tin and hydrochloric acid, and finally converting the resultant p-amino compounds, again analogous to the eighth process, into the corresponding p-(1-pyrrolyl) compounds.

Starting materials of General Formula VII are obtained by converting polymeric p-aminobenzaldehyde or 4-amino-3-chloro-benzaldehyde analogous to the eighth process into p-(1-pyrrolyl)-benzaldehyde or 3-chloro-4-(1-pyrrolyl)-benzaldehyde, respectively, and reacting these aldehydes with nitromethane, for example by boiling in glacial acetic acid in the presence of ammonium acetate or sodium acetate. The aldehydes required can also be produced from the correspondingly substituted benzoic acids, thus, e.g., p-(1-pyrrolyl)-benzaldehyde via N,N-ethylene-p-(1-pyrrolyl)-benzamide.

If desired, the new basic pyrrole derivatives of General Formula I obtained according to the processes of the invention are subsequently converted by conventional methods into their acid addition salts. For example, a solution of a compound of General Formula I in an organic solvent such as acetone, methanol, ethanol, dioxan, tetrahydrofuran or diethyl ether, is treated with an acid of the desired salt component or a solution of said acid, and the salt is separated which precipitates either directly or after the addition of a second organic liquid, such as diethyl ether to methanol or acetone.

For use as active substances for medicaments, if desired, pharmaceutically acceptable acid addition salts, i.e. salts with acids the anions of which in the dosages to be applied have either no pharmacological effect of their own or a desired effect, may be used instead of the free bases; such salts are particularly preferred for solutions. For the formation of pharmaceutically acceptable salts of compounds of Formula I the following acid, for example, can be used: hydrochloric acid, hydrobromic acid, sulphuric acid, phosphoric acid, methane-sulphonic acid, ethane-disulphonic acid, β-hydroxy-ethane-sulphonic acid, acetic acid, malic acid, tartartic acid, citric acid, lactic acid, succinic acid, fumaric acid, maleic acid, ascorbic acid, salicylic acid, mandelic acid, embonic acid or 1,5-naphthalene-disulphonic acid.

The new basic pyrrole derivatives of General Formula I and their pharmaceutically acceptable acid addition salts are administered, as mentioned above, orally, rectally or parenterally. The daily doses for mammals range between 1 and 100 mg./kg. of body weight. Suitable dosage units such as dragées, tablets, suppositories or ampoules contain as active ingredient preferably 5–500 mg. of a compound of Formula I or a pharmaceutically acceptable acid addition salt thereof.

In dosage units for oral administration, the amount of active ingredient is preferably between 10% and 90%. To produce such dosage units, the active ingredient is combined, e.g., with solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate, or polyethylene glycols, to form tablets or dragée cores. The latter are coated, e.g. with concentrated sugar solutions which may also contain, e.g. gum arabic, talcum and/or titanium dioxide; or they are coated with a lacquer dissolved in readily volatile organic solvents or mixtures of solvents. Dyestuffs can be added to these coatings, e.g. for identification of the various dosage amounts. Further dosage units suitable for oral administration are hard gelatin capsules as well as soft closed capsules made from gelatine and a softener, such as glycerin. The hard capsules contain the active substance preferably as a granulate, e.g. in admixture with lubricants such as talcum or magnesium stearate, and, optionally, stabilizers such as sodium metabisulphite ($Na_2S_2O_5$) or ascorbic acid. In soft capsules, the active substance is preferably dissolved or suspended in suitable liquids such as liquid polyethylene glycols, whereby likewise stabilizers can be added.

Suitable as dosage units for rectal administration are, e.g., suppositories consisting of a combination of an active substance and a suppository base of natural or synthetic triglycerides (e.g. cocoa butter), polyethylene glycols or suitable higher fatty alcohols, and gelatine rectal capsules containing a combination of the active substance and polyethylene glycols.

Ampoule solutions for parenteral administration, in particular intramuscular, and also intravenous administration, contain, e.g., an aqueous, preferably 0.5–10% solution of a pharmaceutically acceptable, water-soluble acid addition salt of a compound of General Formula I, or a compound of General Formula I in a concentration of preferably 0.5–5% prepared as an aqueous dispersion with the aid of conventional solubilizers and/or emulsifying agents as well as optionally of stabilizing agents.

Suitable as other parenteral application forms are, for example, lotions, tincture and ointments prepared with conventional auxiliaries for percutaneous application.

The following prescriptions illustrate the production of various application forms:

(a) 500 g. of active substance, e.g. 1 - [p-[1-(methyl-amino-methyl)-propyl]-phenyl] - pyrrole hydrochloride are mixed together with 550 g. of lactose and 292 g. of potato starch. The mixture is moistened with an alcoholic solution of 8 g. of gelatine and granulated through a sieve. After drying, 60 g. of potato starch, 60 g. of talcum, 10 g. of magnesium stearate and 20 g. of highly dispersed silicon dioxide are mixed in and the mixture is pressed into 10,000 tablets each weighing 1500 mg. and each containing 50 mg. of active substance. Optionally, the tablets can be grooved for finer adjustment of the dosage amount.

(b) 25 g. of active substance, e.g. 1-[p-(2-aminoethyl)-phenyl]-pyrrole hydrochloride, are well mixed with 16 g. of maize starch and 6 g. of highly dispersed silicon dioxide. The mixture is moistened with a solution of 2 g. of stearic acid, 6 g. of ethyl cellulose and 6 g. of stearin in about 70 ml. of isopropyl alcohol and is granulated through a sieve III (Ph. Helv. V). The granulate is dried for about 14 hours and is then put through sieve III–IIIa. It is then mixed with 16 g. of maize starch, 16 g. of talcum and 2 g. of magnesium stearate and the mixture is pressed into 1000 dragée cores. These are coated with a concentrated syrup of 2 g. of shellac, 7.5 g. of gum arabic, 0.15 g. of dyestuff, 2 g. of highly dispersed silicon dioxide, 25 g. of talcum and 53.35 g. of sugar, and dried. The dragées obtained each weigh 185 mg. and each contain 25 mg. of active substance.

(c) 50 g. of 1-[p-[2-(dimethylamino)-ethyl]-phenyl]-pyrrole hydrochloride and 1950 g. of finely ground suppository foundation substance (e.g. cocoa butter) are thoroughly mixed and then melted. From the melt, maintained homogeneous by stirring, 1000 suppositories of 2 g. each are poured. They each contain 50 mg. of active substance.

(d) 2.5 g. of 1-[4-(2-aminoethyl)-2-chlorophenyl]-pyrrole hydrochloride and 0.10 g. of ascorbic acid are dissolved in distilled water and diluted to 100 ml. The solution obtained is used to fill ampoules, each containing e.g. 1 ml., corresponding to a content of 25 mg. of active substance. The filled ampoules are sterilized by heating in the usual manner.

(e) 2 g. of 1-[p-(2-amino-1-methylethyl)-phenyl]-pyrrole hydrochloride and 4.4 g. of glycerin are dissolved in distilled water to give 200 ml. and the solution is filled into 100 ampoules each of 2 ml. and each containing 20 mg. of active substance.

The following examples will serve to further illustrate the production of the compounds of the invention, but they in no way should be construed as to limit the scope of the invention. Where not stated otherwise, the pyrrole derivatives used as starting materials are described in French Pat. No. 1,543,100. The temperatures are given in degrees centigrade.

Example 1

A solution of 22.8 g. of N,N-dimethyl-[p-(1-pyrrolyl)-phenyl]-acetamide in 600 ml. of absolute ether is added dropwise to a suspension of 7.6 g. of lithium aluminium hydride in 150 ml. of absolute ether. The reaction mixture is refluxed with stirring for 48 hours. The excess hydride is then decomposed by the dropwise addition of 20 ml. of water with cooling. After the addition of 20 ml. of concentrated potassium hydroxide solution, the ethereal phase is separated, dried over magnesium sulphate, and concentrated by evaporation. The crude amine is distilled in a bulb tube at 130° under 0.01 torr. 19.8 g. (93% of theory) of crystallized 1-[p-[2-(dimethylamino)-ethyl]-phenyl]-pyrole are obtained. After dissolving in 150 ml. of ether, 68 ml. of 1.4 N ethereal hydrogen chloride solution are added. The hydrochloride is removed by filtration (18.7 g.) and recrystallized from ethanol. The pure 1-[p-[2-(dimethylamino)-ethyl]-phenyl]-pyrrole hydrochloride melts at 228–232°.

Analogously, starting from 25.6 g. of N,N-diethyl-2-[p-(1-pyrrolyl)-phenyl]-acetamide there are obtained 19.6 g. (81% of theory) of 1-[p-[2-(diethylamino)-ethyl]-phenyl]-pyrrole (B.P. 130–140°/0.01 torr in a bulb tube), which is converted with 9.4 g. of fumaric acid, dissolved in 100 ml. of methanol, into the fumarate which melts at 123–125° (from isopropanol, 25.1 g.). The amides required as starting materials can be produced in the following manner:

(a) 34.0 g. of ethyl [p-(1-pyrrolyl)-phenyl]-acetate and 50 ml. of a 30% solution of dimethylamine in absolute ethanol are heated for 18 hours in an autoclave at 220°. The reaction mixture is concentrated by evaporation and the residue is recrystallized from isopropanol. 23.5 g. (69% of theory) of N,N-dimethyl-2-[p-(1-pyrrolyl)-phenyl]-acetamide, M.P. 94–96°, are obtained.

Analogously, employing 100 ml. of diethylamine and heating to 200° for 15 hours, 25.8 g. (67% of theory) of N,N-diethyl-2-[p-(1-pyrrolyl) - phenyl] - acetamide, M.P. 78–81° (from isopropanol), are obtained.

Example 2

9.1 g. of lithium aluminium hydride, suspended in 1.5 liters of absolute ether, are heated with stirring to the boil. Between the reaction flask and the reflux condenser, an extraction device fitted with a glass frit and filled with 33.0 g. of 2-[p-(1-pyrrolyl)-phenyl]-butyramide, has been inserted. During 16 hours the refluxing ether dissolves the difficultly soluble amide in the hydride suspension. Then the reaction mixture is refluxed for 24 hours more with stirring. Then 20 ml. of water are carefully added dropwise with ice cooling to the reaction mixture. After the addition of 30 ml. of concentrated potassium hydroxide solution, the ether phase is removed, the aqueous phase is again extracted with 200 ml. of ether, and the combined ether extracts are dried over potassium carbonate. After the ether has been removed by evaporation, the residual oil is distilled in a bulb tube at 140° under 0.03 torr. The 1-[p-[1-(aminomethyl)-propyl]-phenyl]-pyrolle (23.6 g., 76% of theory), obtained as a colorless oil, is converted with the calculated amount of ethereal hydrogen chloride solution into the hydrochloride. After recrystallization from absolute ethanol, the hydrochloride melts at 176–181°.

Example 3

7.1 g. of N,N-diethyl-2-[p-(1-pyrrolyl)-phenyl]-butyramide, dissolved in 50 ml. of absolute ether, are added dropwise with stirring to a suspension of 2.0 g. of lithium aluminium hydride in 100 ml. of absolute ether, whereby the reaction comes to the boil. Heating at the boil is continued with stirring and refluxing for 48 hours. After adding 10 ml. of water while cooling with ice, 10 ml. of concentrated potassium hydroxide solution are added and the phases are separated. The ether phase is dried over potassium carbonate and concentrated by evaporation. 6.8 g. of crude, oily 1-[p-[1-(diethylaminomethyl)-propyl]-phenyl]-pyrrole are thus obtained. After dissolving in ether, this compound is added in as small an amount as possible (50 ml.) of methanol to a solution of 2.8 g. of fumaric acid. The fumarate, which precipitates after condensing the solution and cooling, is recrystallized from isopropanol and melts then at 140–141° (7.2 g., 74% of theory).

The amide required as starting material is produced as follows:

(a) 11.5 g. of 2-[p-(1-pyrrolyl)-phenyl]-butyric acid are dissolved in 300 ml. of dry dioxane, and 7.1 g. of triethyl amine are added. Then while cooling at 10°, 9.6 g. of isobutyl chloroformate in 10 ml. of absolute dioxane are added dropwise. The semifluid reaction mixture is then stirred for 15 minutes more at 10°. After the addition of 5.3 g. of diethyl amine at 10–25°, the suspension is stirred at room temperature for about 15 hours. The reaction mixture is then concentrated by evaporation at 20 torr and the residue is distributed between 20 ml. of water and 200 ml. of methylene chloride. The organic phase is washed with 20 ml. of 2 N sodium hydroxide solution and 20 ml. of water, dried over magnesium sulphate, and concentrated by evaporation. The oily residue is distilled in a bulb tube at 160° under 0.01 torr. 8.9 g. (62% of theory) of N,N-diethyl-2-[p-(1-pyrrolyl)-phenyl]-butyramide, M.P. 122–124° (from isopropanol), are obtained.

Example 4

9.5 g. of 2-[p-(1-pyrrolyl)-phenyl]-acetamide are gradually added to 190 ml. of an 0.85-molar solution of diborane in tetrahydrofuran. A solution is formed with foaming. This is allowed to stand for 2–3 days at room temperature in the dark, while excluding moisture. It is then concentrated by evaporation at about 20 torr. The residue is dissolved in methanol (about 200 ml.) and strongly acidified with ethereal hydrogen chloride solution. The reaction mixture is then refluxed for 30 minutes and then concentrated again by evaporation under reduced pressure. The residue is taken up in about 50 ml. of water, made alkaline (pH 10–11) with concentrated potassium hydroxide solution and extracted with a total of 30 ml. of ether. The ether phase is separated, washed with 300 ml. of water and dried over magnesium sulphate. The ether is removed by evaporation, and the oily residue of 5.8 g. of crude base is dissolved in 50 ml. of ether and converted with the calculated amounts of ethereal hydrogen chloride solution (e.g. 7.3 ml. of 4.3 N solution) into the hydrochloride. The salt which precipitates as crystals (6.4 g., 60% of theory) is recrystallized from ethanol/water. Pure 1-[p-(2-aminoethyl)-phenyl]-pyrrole hydrochloride, M.P. 290–293° (with decomposition), is thus obtained.

In an analogous manner there is obtained:

using 30.0 g. of N-methyl-2-[p-(1-pyrrolyl)-phenyl]-acetamide and 450 ml. of 0.95-molar diborane solution in tetrahydrofuran,
28.0 g. (85% of theory) of crude 1-[p-[2-methylamino)-ethyl]-phenyl]-pyrrole hydrochloride which, after crystallization from methanol, melts at 254–256° (18.4 g. of pure substance).

(a) The amides required as starting materials are obtained by reacting ethyl [p-(1-pyrrolyl)-phenyl]-acetate with a large excess of the appropriate amine in an autoclave at raised temperature and pressure. If solvents or non-volatile amines are used, the reaction mixture is concentrated by evaporation. The crude crystalline product is washed with 30–50 ml. of ether and the crude or recrystallized product is used for the reduction.

Thus there are obtained:

from 15.0 of ethyl [p-(1-pyrrolyl)-phenyl]-acetate and 40 g. of pure ammonia (liquid) by heating to 200° for 12 hours,
11.4 g. (87% of theory) of 2-[-(1-pyrrolyl)-phenyl]-acetamide, M.P. 251–252° (from methanol); and
from 68.0 g. of the same acetate, 190 g. of methyl amine and 400 ml. of absolute alcohol by heating at 180° for 12 hours,
52.0 g. (82% of theory) of N-methyl-2-[p-(1-pyrrolyl)-phenyl]-acetamide, M.P. 174–176° (from methanol).

Example 5

Analogously to Example 4, there are obtained:

using 7.0 g. of p-(1-pyrrolyl)-hydratropamide and 100 ml. of 1.0-molar diborane solution in tetrahydrofuran,
5.7 g. (87% of theory) of crude 1-[p-(2-amino-1-methylethyl)-phenyl]-pyrrole, the hydrochloride of which melts at 228–231° (from absolute ethanol), and
using 7.9 g. of N-methyl-p-(1-pyrrolyl)-hydratropamide and 110 ml. of 0.85-molar diborane solution in the tetrahydrofuran,
7.7 g. of crude oily amine which is converted with the calculated amount of ethereal hydrogen chloride solution to 6.1 g. (70% of theory) of 1-[p-[1-methyl-2-(methylamino)-ethyl]-phenyl] - pyrrole hydrochloride, M.P. 208–212° (from isopropanol).

(a) The amides required as starting materials are obtained fully analogously to Example 4(a).

Thus there are obtained:

from 10.8 g. of methyl p-(1-pyrrolyl)-hydratropate and 30 g. of liquid ammonia by heating for 10 hours at 200°,
7.0 g. (69% of theory) of p-(1-pyrrolyl)-hydratropamide, M.P. 161–163° (from isopropanol), and
from 18.8 g. of the same hydratropate and 50 g. of methylamine,
7.9 g. (42% of theory) of N-methyl-p-(1-pyrrolyl)-hydratropamide, M.P. 145–148° (from isopropanol).

Example 6

30.0 g. of N-methyl-2-[p-(1-pyrrolyl)-phenyl]-butyramide are reacted with 700 ml. of 0.76-molar diborane solution in tetrahydrofuran and further processed fully analogously to Example 4. In this manner, 30.0 g. (30% of theory) of crude 1-[p-[1-(methylamino-methyl)-propyl]-phenyl]-pyrrole hydrochloride is obtained, which after recrystallization from isopropanol melts at 182–185° (19.2 g. of pure substance).

(a) The amide required as starting material is prepared analogously to Example 4(a) by heating 77 g. of ethyl 2-[p-(1-pyrrolyl)-phenyl]-butyrate with 190 g. of methylamine in 300 ml. of absolute ethanol for 12 hours at 180° in an autoclave. In this manner 54.5 g. (75% of theory) of N-methyl-2-[p-(1 - pyrrolyl)-phenyl]-butyramide, M.P. 166–167°, are obtained.

Example 7

By reacting 14.4 g. of 2-[3-chloro-4-(1-pyrrolyl)-phenyl]-acetamide with 200 ml. of 1.0-molar diborane solution in tetrahydrofuran analogously to Example 4, 10.0 g. (73% of theory) of crude 1-[4-(2-aminoethyl)-2-chlorophenyl]-pyrrole are produced, which distills at 120–140° under 0.01 torr. From the base with 32 ml. of 1.4 N ethereal hydrogen chloride solution, the hydrochloride is obtained which, after recrystallization from isopropanol, melts at 203–205°. Yield 10.5 g., 63% of theory.

In an analogous manner there are obtained:

using 10.0 g. of 2-[3-chloro-4-(1-pyrrolyl)-phenyl]-N-methylacetamide and 115 ml. of 0.85-molar diborane solution in tetrahydrofuran, 5.7 g. (53% of theory) of 1-[2-chloro-4-[2-methylamino)-ethyl]-phenyl]-pyrrole hydrochloride, M.P. 173–177° (from isopropanol), and using 26.5 g. of 2-[3-chloro-4-(1-pyrrolyl)-phenyl]-N,N-dimethyl-acetamide and 250 ml. of 1.17-molar diborane solution in tetrahydrofuran, 15.7 g. (55% of theory) of 1-[2-chloro-4-[2-(dimethylamino) - ethyl] - phenyl]-pyrrole hydrochloride which, after recrystallization from isopropanol and then from absolute ethanol, melts at 210–214°.

(a) The amides required as starting materials are produced analogously to Example 4(a).

Thus there are obtained:

from 30.0 g. of ethyl [3-chloro-4-(1-pyrrolyl)-phenyl]-acetate and 75 g. of liquid ammonia by heating at 200° for 12 hours, 25 g. of crude amide as a dark oil. This is distilled in a bulb tube at 180–190° under 0.04 torr. By rcerystallizing from isopropanol, 14.4 g. (54% of theory) of colorless 2-[3-chloro-4-(1-pyrrolyl)-phenyl]-acetamide, M.P. 95–96°, are obtained;

from 30.0 g. of the same acetate and 60 g. of methylamine by heating at 180° for 10 hours and distilling in a bulb tube at 170–190°/0.03 torr, 19.0 g. (67% of theory) of 2-[3-chloro-4-(1-pyrrolyl)-phenyl]-N-methyl-acetamide, M.P. 118–121° (from isopropanol); and from 30.0 g. of the same acetate and 85 g. of dimethylamine by heating at 150° for 15 hours and distilling in a bulb tube at 160–180° 0.1 torr, 26.5 g. (88% of theory) of 2-[3-chloro-4-(1-pyrrolyl)-phenyl]-N,N-dimethyl-acetamide as yellow, cloudy oil, which is used for further processing without purification.

The acetate required as starting material is obtained by boiling 40 g. of the acid in 200 ml. of absolute ethanol and 6 ml. of concentrated sulphuric acid for 4 hours: B.P. 170–190°/0.1 torr, M.P. 36–37° (from ligroin).

Example 8

5.6 g. of 3-chloro-4-(1-pyrrolyl)-hydratropamide are reacted analogously to Example 4 with 67 ml. of a 1.0-molar diborane solution in tetrahydrofuran. 4.9 g. of the crude base are obtained, which is dissolved in 50 ml. of ether and converted with the calculated amount of ethereal hydrogen chloride solution (e.g. 7.0 ml. of 3.0 N solution) to 3.4 g. (56% of theory) of the hydrochloride. After recrystallization from isopropanol, the pure 1-[4-(2-amino-1-methylethyl)-2-chlorophenyl]-pyrrole hydrochloride melts at 183–186°.

(a) The amide required as starting material can be prepared in the following manner:

6.0 g. of 3-chloro-4-(1-pyrrolyl)-hydratropic acid are dissolved in a mixture of 50 ml. of dioxane and 100 ml. of methylenechloride, 3.4 g. of triethylamine are added and cooled to 10°. With stirring and further cooling with ice to 8–12°, 4.9 g. of isobutyl chloroformate are added dropwise. The reaction mixture is stirred for 10 minutes more at 8–12°. Then without further cooling, a strong current of dry ammonia is introduced for 10 minutes. The reaction mixture is then stirred for 2 hours at room temperature and further processed analogously to Example 3(a). In this manner, 3-chloro-4-(1-pyrrolyl)-hydratropamide is obtained as a yellow oil which distills at 130–140°/0.01 torr.

Example 9

A solution of 10.4 g. of N-[p-(1-pyrrolyl)-phenethyl]-acetamide in 200 ml. of 1,2-dimethoxy-ethane is added dropwise with stirring to a suspension of 5.1 g. of lithium aluminium hydride in 200 ml. of absolute ether. After completion of the addition, the reaction mixture is refluxed with stirring for 48 hours. The inner temperature gradually rises due to evaporation of the ether from 50 to 85°. Then, while cooling with ice, 10 ml. of water are added dropwise to the reaction mixture which, after the addition of 20 ml. of concentrated potassium hydroxide solution and 300 ml. of ether, is vigorously stirred. The organic phase is separated, dried over calcium chloride, and concentrated by evaporation in a water jet vacuum. After distilling in a bulb tube at 130°/0.01 torr, 3.0 g. (31% of theory) of 1-[p-[2-(ethylamino)-ethyl]-phenyl]-pyrrole are obtained. This is dissolved in 5 ml. of ether, and 3.2 ml. of a 4.6 N solution of hydrogen chloride in ether is added. In this manner the hydrochloride is obtained, M.P. 265–268° (from ethanol/methanol).

The amide required as starting material is prepared in the following manner:

(a) 20.0 g. of 1-[p-(2-aminoethyl)-phenyl]-pyrrole (cf. Examples 4,12 and 14) are dissolved by slight heating in 50 ml. of dioxane; 13 ml. of acetanhydride are then added. A spontaneous, exothermic reaction commences. After the reaction subsides, the mixture is refluxed for 20 minutes. On cooling. 18.9 g. (77% of theory) of N-[p-(1-pyrrolyl)-phenethyl]-acetamide, M.P. 174–177°, crystallizes. After recrystallization from ethanol, the melting point rises to 177–178°.

Another process for producing the above starting material is described in Example 26(a).

Example 10

4.0 g. of N-methyl-N-[p-(1-pyrrolyl)-phenethyl]-acetamide are reduced analogously to Example 1, using 1.0 g. of lithium aluminium hydride in 100 ml. of absolute ether. After distilling the crude base in a bulb tube at 130–140°/0.02 torr, there are obtained 2.3 g. (61% of theory) of 1-[p-[2-(ethyl-methylamino)-ethyl]-phenyl]-pyrrole as a yellowish oil. It is converted with 2.2 ml. of a 4.6 N ethereal hydrogen chloride solution into the hydrochloride which melts at 165–169° (from isopropanol).

The starting material is obtained by acetylation of 4.2 g. of 1-[p-[2-(methylamino)-ethyl]-phenyl]-pyrrole (cf. Example 4) with 3 ml. of acetanhydride in 10 ml. of dioxane analogously to Example 9(a). Yield 90%, M.P. 77–79° (from ether).

Example 11

Analogously to Example 1, 17 g. of crude 1-[p-(dimethylaminomethyl) - propyl] - phenyl] - pyrrole are obtained as an oil which solidifies to crystals starting from 5.7 g. of lithium aluminium hydride in 200 ml. of absolute ether and 19.2 g. of N,N-dimethyl-2-[p-(1-pyrrolyl)-phenyl]-butyramide, dissolved in 200 ml. of absolute ether. The acid fumarate is subsequently prepared by reaction with 8.1 g. of fumaric acid dissolved in 150 ml. of methanol and concentration of the resulting solution. After recrystallisation from isopropanol 17.5 g. of the colourless fumarate are obtained, M.P. 137–140° (65% of theoretical yield).

Analogously 24.6 g. of crude 1-[p-[2-(dimethylamino)-1-methyl-ethyl]-phenyl]-pyrrole are obtained starting from 24.6 g. of N,N-dimethyl-p-(1-pyrrolyl)-hydratropamide dissolved in 100 ml. of absolute ether and 7.7 g. of lithium aluminium hydride suspended in 400 ml. of absolute ether. The hydrochloride is subsequently prepared by dissolving the above product in 300 ml. of absolute ether and adding 30 ml. of 3–n ethereal hydrogen chloride. 24.0 g. of the hydrochloride are obtained, M.P. 227–230° (from isopropanol) (89% of theoretical yield).

The required amide starting materials can be prepared analogously to Example 3(a) as follows:

(a) From 30.0 g. 2 - [p-(1-pyrrolyl)-phenyl]-butyric acid, 18.5 g. triethylamine, 26.8 g. chloroformic acid-iso-butylester and 10 g. dimethylamine (gas), 19.5 g. (58% of theory) N,N - dimethyl - 2-[p-(1-pyrrolyl)-phenyl]-butyramide, M.P. 109–110° (from isopropanol);

(b) From 23.0 g. p-(1-pyrrolyl)-hydratropic acid, 13.1 g. triethylamine, 16.8 g. pivalic acid chloride and 6 g.

gaseous dimethylamine, 24 g. orange coloured N,N-dimethyl - p-(1-pyrrolyl)-hydratropamide as an oil which can be reduced without further purification.

Example 12

7.0 g. of 1-[p-[1-(N-carbethoxyaminomethyl)-propyl]-phenyl]-pyrrol in 100 ml. of absolute ether are rapidly added dropwise to a suspension of 3.2 g. of lithium aluminium hydride in 200 ml. of absolute ether. The reaction mixture is stirred under reflux for 42 hours. After cooling 10 ml. of water are added followed by 20 ml. of concentrated potassium hydroxide solution and the ether phase is separated and dried over potassium carbonate. The ether solution is evaporated to give 3.8 g. of 1-[p-[1-(methylaminomethyl)-propyl]-phenyl]-pyrrol as colourless crystals (67% of theoretical yield). The hydrochloride melts at 182–185° (from isopropanol).

The urethane required as starting material can be prepared as follows:

(a) 4.3 g. of chloroformic acid ethyl ester are added dropwise with stirring and cooling to a solution of 7.6 g. of 1-[p-[1-(aminomethyl)-propyl]-phenyl] - pyrrol (cf. Example 2) and 3.5 g. of triethylamine in 100 ml. of methylene chloride and the mixture is stirred for 3 hours at room temperature. The reaction mixture is then extracted with 10 ml. of 2-n hydrochloric acid, washed with 10 ml. of saturated sodium bicarbonate solution and dried over magnesium sulphate. After evaporation of the solvent the residual oil is distilled in a bulb tube at 150–170°/0.02 torr. 7.3 g. of 1-[p-[1-(N-carbethoxyaminomethyl)-propyl]-phenyl]-pyrrol are obtained after recrystallisation from isopropanol, M.P. 69–70° (73% of theoretical yield).

Example 13

9.5 g. of N - [β - methyl-p-(1-pyrrolyl)-phenethyl]-formamide dissolved in a mixture of 80 ml. of absolute ether and 30 ml. of dioxan are added dropwise within ca. 20 minutes to a suspension of 1.6 g. of lithium aluminium hydride in 50 ml. of absolute ether and stirred for 15 hours under reflux. The reaction mixture is then cooled with ice and 5 ml. of water are added. The ether solution is decanted off, dried over magnesium sulphate and evaporated. 9.0 g. of crude 1 - [p-[1-methyl-2(methylamino)-ethyl]-phenyl]pyrrol are obtained (ca. 100% of theoretical yield). The hydrochloride melts at 208–212° (from isopropanol).

The formamide required as starting material can be prepared as follows:

(a) A mixture of 6 ml. of anhydrous formic acid and 14.5 ml. of acetic anhydride is warmed for 2 hours at 60° and then cooled. The resulting mixture is then added dropwise to a solution of 14.0 g. of 1-[p-(2-amino-1-methylethyl)-phenyl]-pyrrol (cf. Example 5) in 100 ml. of ether with ice cooling. After standing overnight at room temperature the mixture is washed twice with 20 ml. of 2-n hydrochloric acid each time and once with 20 ml. of saturated sodium bicarbonate solution, dried and evaporated. The oily residue produces, after distillation in a bulb tube at 180–200°/0.01 torr, 15 g. of N-[β-methyl-p-(1-pyrrolyl)-phenethyl]-formamide as a turbid viscous oil (94% of theoretical yield).

Example 14

3.4 g. of p-(1-pyrrolyl)-phenethyl p-toluene-sulphonate, dissolved in 25 ml. of dimethyl formamide, are allowed to stand for 6–8 days at room temperature with 25 ml. of a 33% solution of dimethylamine in absolute ethanol. After removal of the solvent by evaporation under reduced pressure, the residue is dissolved in 50 ml. of chloroform and washed with 20 ml. each of water and saturated sodium bicarbonate solution. After drying over magnesium sulphate and removal of the solvent by evaporation, the oil which remains is distilled in a bulb tube. After separation of a preliminary run (up to 80°/12 torr), the fraction which distills over at 130–140°/0.01 torr, containing 1.5 g. of crude 1-[p-[2-(dimethylamino)-ethyl]-phenyl]-pyrrole, is dissolved in 5 ml. of ether, and then 1.5 ml. of a 4.6 N solution of hydrogen chloride in absolute ether is added. The crystals obtained are suction filtered and recrystallized from ethanol, 0.9 g. (36% of theory) of pure 1 - [p-[2-(dimethylamino)-ethyl]-phenyl]-pyrrole hydrochloride, M.P. 228–232°, is obtained.

The toluene-sulphonate required as starting material is produced as follows:

(a) A solution of 208.0 g. of ethyl [p-(1-pyrollyl)-phenyl]-acetate in 1.5 liters of absolute ether is added dropwise with cooling to a suspension of 35.0 g. of lithium aluminium hydride in 700 ml. of absolute ether under nitrogen in such a manner that the reaction is kept under control. The reaction mixture is then refluxed with stirring for 20 hours. Then 800 ml. of ice-cold, 20% hydrochloric acid are added dropwise with cooling. The ether phase is separated, washed neutral with sodium bicarbonate solution, and dried with magnesium sulphate. After removal of the ether by evaporation at reduced presure, 166 g. (95% of theory) of p-(1-pyrrolyl)-phenethyl alcohol, M.P. 100–102°, remain which is pure enough for further processing.

(b) From 9.0 g. of p-(1-pyrrolyl)-phenethyl alcohol, dissolved in 50 ml. of absolute pyridine, by reaction with 11.5 g. of p-toluene-sulfonyl chloride analogous to E. Jenny and S. Winstein, Helv. Chimica Acta 41, 820 (1958), there are obtained 14.0 g. (82% of theory) of crude p - (1 - pyrrolyl)-phenethyl p-toluene-sulphonate which, after recrystallization from isopropanol/dioxane, melts at 125–127° (10.5 g., 61% of theory).

Example 15

2.0 g. of β-ethyl-p-(1-pyrrolyl)-phenethyl p-toluene-sulphonate and 20 ml. of a 33% solution of methylamine are heated for 10 hours at 100° in an autoclave. The reaction mixture is concentrated by evaporation, the residue is taken up in water, acidified with a few drops of concentrated hydrochloric acid, and washed with 10 ml. of ether. The aqueous phase is made alkaline with concentrated sodium hydroxide solution and extracted with 20 ml. of ether. After drying over magnesium sulphate, 1.0 ml. of 4.6 N ethereal hydrochloric acid are added to the ether phase. The 1 - [p - [1 - (methylaminomethyl)-propyl]-phenyl]-pyrrole hydrochloride (0.7 g., 49% of theory), which precipitates, melts at 183–185° (from isopropanol).

In an analogous manner, using 10 ml. of liquid ammonia and 10 ml. of absolute ethanol, there is obtained the 1-[p-[1-(aminomethyl)-propyl]-phenyl]-pyrrole hydrochloride, M.P. 176–181° (from isopropanol).

The p-toluene-sulphonate required as starting material is obtained as follows:

(a) 42.5 g. of ethyl 2-[p-(1-pyrrolyl)-phenyl]-butyrate are reduced with 6.3 g. of lithium aluminium hydride in 900 ml. of ether analogously to Example 14(a) to obtain 32.0 g. (90% of theory) of β-ethyl-p-(1-pyrrolyl)phenethyl alcohol, M.P. 56–60°.

(b) 20.0 g. of β-ethyl-p-(1-pyrrolyl)-phenethyl alcohol, dissolved in 100 ml. of pyridine, are reacted analogously to Example 14(b) with 23.0 g. of p-toluene-sulphonic acid chloride to yield, after recrystallization from methanol, 20.2 g. (58% of theory) of β-ethyl-p-(1-pyrrolyl)-phenethyl p-toluene-sulphonate, M.P. 93–95°.

Example 16

2.0 g. of 1-[p-(2-bromethyl)-phenyl]-pyrrole and 2.5 g. of methylamine are heated together in 70 ml. of methanol in an autoclave for 12 hours at 100°. The crystalline residue (2.4 g.) which remains after removal of the solvent by evaporation under reduced pressure is dissolved in 10 ml. of water, alkalized with 5 ml. of concentrated sodium hydroxide solution, and extracted with 50 ml. of chloroform. After drying with magnesium sulphate and removal of the chloroform by evaporation, 1.6 g. of crude 1-[p-[2-methylamino)-ethyl]-phenyl)-pyrrole remain as oil. The crude base is dissolved in 5 ml. of ether and, by the addition of 2 ml. of 4.3 N ethereal hydrogen chloride solution, the 1-[p-[2-(methylamino)-ethyl] - phenyl] - pyrrole hydrochloride is precipitated, which, after recrystallization from methanol, melts at 254–256° with decomposition. Yield 0.7 g., 37% of theory.

In an analogous manner, using 5 ml. of liquid ammonia and heating for 20 hours, there is obtained 0.6 g. (28% of theory) of 1-[p-(2-aminoethyl)-phenyl]-pyrrole hydrochloride, M.P. 290–293° (decomposition) after crystallization from ethanol/water.

The 1-[p - (2 - bromethyl)-phenyl]pyrrole required as starting material is produced as follows:

(a) p-Nitro-phenethyl bromide is reduced by the method given by E. Ferber, Ber. 62, 187–188 (1929), for p-nitro-phenethyl chloride with tin chloride to p-amino-phenethylbromide hydrochloride, M.P. 195–200°.

(b) From 3.5 g. of p-amino-phenethylbromide hydrochloride, the base is set free with concentrated potassium hydroxide solution, extracted with ether, and dried over magnesium sulphate. After removal of the ether by distillation in water jet vacuum at 30° bath temperature, the residual crude p-amino-phenethyl bromide (2.7 g.) is refluxed for 15 minutes with 30 ml. of glacial acetic acid and 1.8 g. of 2,5-dimethoxy-tetrahydrofuran in an oil bath which has been preheated to 130°. The reaction mixture is then concentrated by evaporation at 12 torr and the residue is distilled in a bulb tube at 140–150°/0.002 torr. The crystalline 1-[p-(2-bromoethyl)-phenyl]-pyrrole is recrystallized from methanol, whereupon it melts at 101–103°.

Example 17

7.1 g. of p-toluene sulphonic acid-[β-methyl-p-(1-pyrrolyl)-phenethyl]-ester, 7 ml. of liquid ammonia and 100 ml. of absolute ethanol are mixed and heated for 14–15 hours at 100° in an autoclave. The procedure outlined in Example 15 is then carried out to give 1.9 g. of 1-[p-(2 - amino-1-methylethyl)-phenyl]pyrrole]hydrochloride, M.P. 228–231° (from absolute ethanol) (40% of theoretical yield).

Analogously are obtained:

(i) Using, in place of ammonia, 30 ml. of a 33% solution of methylamine in absolute ethanol, 3.1 g. of 1-[p-[1-methyl - 2 - (methylamino)-ethyl]-phenyl]-pyrrole-hydrochloride M.P. 208–212° (from isopropanol) (62% of theoretical yield).

(ii) Using, in place of ammonia, 30 ml. of a 33% solution of dimethylamine in absolute ethanol, 3.4 g. of 1-[2-(dimethylamino)-1 - methylethyl]-phenyl-pyrrole-hydrochloride M.P. 227–230° (from isopropanol) (65% of theoretical yield).

The p-toluene sulphonic acid esters required as starting materials can be prepared as follows:

(a) 52.0 g. of p-(1-pyrrolyl)-hydratropic acid-ethyl ester and 8.2 g. of lithium aluminium hydride are reacted analogously to Example 14 to give 42.0 g. (98% of theoretical yield) of crude β-methyl-p-(pyrrolyl)-phenethyl-alcohol, M.P. 74–76° which is used without further purification in the following reaction step.

(b) 29.0 g. of β-methyl-p-(1-pyrrolyl)-phenethyl alcohol are reacted, analogously to Example 14(b), in 150 ml. of pyridine with 35.0 g. of p-toluenesulphonyl chloride and then poured into 1 litre of ice-water. After recrystallization from methanol 37.4 g. of p-toluene sulphonic acid-[β-methyl - p - (1-pyrrolyl)-phenethyl]-ester, M.P. 98–101° (73% of theoretical yield).

Example 18

2 ml. of liquid ammonia are dissolved in 50 ml. of absolute ethanol and heated for 10 hours at 100° in an autoclave with 2.0 g. of p-toluene -sulphonic acid-[3-chloro - 4 - (1 - pyrrolyl)-phenethyl]-ester. The procedure outlined in Example 15 is then carried out to give 0.6 g. of 1-[4-(2-aminoethyl) - 2 - chlorophenyl]-pyrrole-hydrochloride M.P. 203–205° (from absolute ethanol) (44% of theoretical yield).

Analogously is obtained using, in place of ammonia, 6 ml. of a 33% solution of methylamine in absolute ethanol, 0.95 g. of 1-[2 - chloro - 4 - [2-(methylamino)-ethyl]-phenyl]-pyrrole-hydrochloride, M.P. 177° (from isopropanol) (65% of theoretical yield).

The p-toluene sulphonic acid esters required as starting materials can be prepared as follows:

(a) 26.3 g. of [3-chloro-4-(1-pyrrolyl)-phenyl]-acetic acid-ethyl ester dissolved in 500 ml. of absolute ether are added dropwise to a suspension of 4.1 g. of lithium aluminium hydride in 300 ml. of absolute ether so that the reaction mixture boils and the mixture is then refluxed for 4 hours. The resulting mixture is cooled with ice and 20 ml. of water and 10 ml. of concentrated potassium hydroxide solution are added. The ether phase is separated and evaporated and the residue is dissolved in 300 ml. of ethanol and, after the addition of 25 ml. of 2-n sodium hydroxide solution, left to stand for one hour at 20–30°. After evaporating the ethanol at reduced pressure the residue is taken up in 20 ml. of water and extracted with 100 ml. of ether. The ether phase is separated, dried over magnesium sulphate and evaporated. The residue is then distilled in a bulb tube at 140°/0.01 torr to give 13.0 g. of 3-chloro-4-(1-pyrrolyl)-phenethyl-alcohol as an oil which solidifies to a crystalline mass, M.P. 58–62° (59% of theoretical yield).

(b) 12.6 g. of 3-chloro-4-(1-pyrrolyl)-phenethyl-alcohol, 70 ml. of pyridine and 14 g. of p-toluenesulphonic acid chloride are reacted analogously to Example 14(b) to give 15 g. of crude oily p-toluene-sulphonic acid-[3-chloro-4-(1-pyrrolyl)-phenethyl]-ester (70% of theoretical yield). A sample chromatographed on silicagel showed $n_D^{22}$ 1.590.

Example 19

10.0 g. of p-toluenesulphonic acid-[β-ethyl-p-(1-pyrrolyl)-phenethyl]-ester (cf. Example 15(b)) are dissolved in 100 ml. of absolute ethanol and heated for 15 hours at 120° in autoclave with 100 ml. of a 33% solution of dimethylamine in absolute ethanol. The procedure outlined in Example 15 is then carried out to give 4.2 g. of 1 - [p - [1-dimethylaminomethyl)-propyl]-phenyl]-pyrrol (63% of theoretical). Reaction with the equivalent amount of fumaric acid produces the crystalline fumarate M.P. 137–140° (from isopropanol).

Example 20

27.8 g. of [p-(1-pyrrolyl)-phenyl]-acetonitrile in 250 ml. of methanol which has been saturated with ammonia at 20° are hydrogenated in an autoclave at 70–80° and 120 atm. in the presence of 5 g. of Raney nickel. After 2 equivalents of hydrogen have been taken up, the hydrogenation ceases. The catalyst is removed by filtration and the solvent is removed by evaporation at reduced pressure. The concentrated residue is distilled in a bulb tube at 130–150° and 0.1 torr. 26.4 g. (92% of theory) of 1-[p-(2-aminoethyl)-phenyl]-pyrrole are obtained as a yellowish oil which solidifies to a crystalline slurry. It is dissolved in 300 ml. of ethanol and then 142 ml. of 1.0 N aqueous hydrochloric acid are added. A homogeneous solution is obtained by heating, from which upon cooling the 1-[p-(2-aminoethyl)-phenyl]-pyrrole hydrochloride separates as colorless crystals, M.P. 290–293° (decomposition). Yield 21.8 g., 65% of theory.

Example 21

A solution of 3.3 g. of anhydrous aluminium chloride in 50 ml. of absolute ether is added dropwise to a suspension of 0.95 g. of lithium aluminium hydride in 25 ml.

of absolute ether. After 5 minutes a solution of 5.25 g. of α-ethyl-p-(1-pyrrolyl)-phenylacetonitrile in 100 ml. of absolute ether is added dropwise within 15 minutes. The reaction mixture is then stirred for 22 hours under reflux and after cooling with ice 5 ml. of water and 3 ml. of concentrated potassium hydroxide solution are added. The ether phase is separated, dried over magnesium sulphate and evaporated. The residual oil is dissolved in 30 ml. of ether and neutralised with a solution of hydrogen chloride in ether. 2.35 g. of crude 1-[p-[1-(aminomethyl)-propyl]-phenyl]-pyrrole-hydrochloride are obtained which melt at 176–181° after recrystallisation from methanol/ether followed by absolute ethanol (36% of theoretical yield).

The nitrile required as starting material can be prepared as follows:

(a) A mixture of 11.4 g. of 2-[p-(1-pyrrolyl)-phenyl]-butyramide, 10.6 g. of p-toluene-sulphonic acid chloride and 15 g. of pyridine are heated for 6 hours at 100°. The reaction mitxure is then cooled and partitioned between 500 ml. of ether and 50 ml. of water. The ether phase is washed twice with 30 ml. of 2-n hydrochloric acid each time followed by 30 ml. of water, dried over magnesium sulphate and evaporated. After distillation in a bulb tube at 130–140°/0.2 torr 9.8 g. of α-ethyl-p-(1-pyrrolyl)-phenylacetonitrile are obtained which gradually crystallise, M.P. 35–37° (93% of theoretical yield).

Example 22

13 ml. of a 2-molar solution of diborane in tetrahydrofuran is added dropwise to a solution of 5.9 g. of 3-chloro-4-(1-pyrrolyl)-phenyl-acetonitrile in 150 ml. of tetrahydrofuran with cooling. The reaction mixture is allowed to stand for 2 to 3 days at room temperature, with the exclusion of moisture and then evaporated under reduced pressure. 50 ml. of methanol followed by 15 ml. of a 3-n ethereal hydrogen chloride solution are then added carefully to the residue. The mixture is then refluxed for 20 minutes and again evaporated under reduced pressure. The residue is dissolved in 50 ml. of water and extracted once with 50 ml. of ether. The aqueous phase is then made basic with concentrated potassium hydroxide solution and the crude 1-[4-(2-aminoethyl)-2-chlorophenyl]-pyrrole (3.2 g., 53% of theoretical yield) is extracted with 100 ml. ether. The hydrochloride thereof melts at 203–205° (from isopropanol).

Analogously 3.9 g. (69% of theoretical yield) of 1-[p-(2 - amino-1-methylethyl)-phenyl]-pyrrole are obtained [M.P. of hydrochloride 228–231° (from absolute ethanol)] starting from 5.5 g. of α-methyl-p-(1-pyrrolyl)-phenylacetonitrile.

The nitrile required as starting material can be obtained as follows:

(a) 8.0 g. of 2-[3-chloro-4-(1-pyrrolyl)-phenyl]-acetamide (cf. Example 7(a)), 10.3 g. of pyridine and 7.2 g. of p-toluensulphonic acid chloride are stirred together for 6 hours in a bath at 100°. After cooling, the reaction mixture is partitioned between 200 ml. of ether and 50 ml. of water. The ether phase is washed twice with 30 ml. of 2-n hydrochloric acid, water and saturated sodium-bicarbonate solution each time, dried over magnesium sulphate and evaporated. The residue is distilled in a bulb tube at 150–160°/0.1 torr and 6.5 g. of 3-chloro-4-(1-pyrrolyl)-phenylacetonitrile, M.P. 57–61° (88% of theoretical yield).

(b) Analogously 4.1 g. of α-methyl-p-(1-pyrrolyl)-phenylacetonitrile, M.P. 85–90° are obtained from 7.0 g. of p-(1-pyrrolyl)-hydratropamide (cf. Example 5(a)) (64% of theoretical yield).

Example 23

3.16 g. of N-[2-[p-(1-pyrrolyl)-phenyl]-ethyl]-phthalimide and 0.53 g. of hydrazine hydrate are refluxed in 35 ml. of ethanol for 6 hours. Then 3 ml. of 20% hydrochloric acid are added, the mixture is refluxed for 15 minutes more, allowed to cool, the precipitated phthalhydrazide is suction filtered and rinsed with water. The filtrate is concentrated to dryness by evaporation, the residue is taken up in water, and the solution is made alkaline with 2 N sodium hydroxide solution. It is extracted with ether, the ether phase is dried over potassium hydroxide and the solution is concentrated. The 1-[p-(2-aminoethyl)-phenyl]-pyrrole crystallizes (1.2 g.). It is dissolved in 2 ml. of ethanol, and 3.2 ml. of 2 N aqueous hydrochloric acid are added. The precipitate which separates is dissolved by heating. The 1-[p-(2-aminoethyl)-phenyl]-pyrrole hydrochloride (1.1 g., 50% of theory) which separates on cooling, melts, after recrystallization from ethanol/water, at 290–293° (with decomposition).

The phthalimide required as starting material is produced as follows:

(a) A solution of 51 g. of p-(1-pyrrolyl)-phenethyl p-toluene-sulphonate [cf. Example 14(b)] and 42 g. of potassium phthalimide in 1000 ml. of dimethyl formamide is heated at 100° with stirring for 15 hours. The dimethyl formamide is substantially removed by distillation in a rotary evaporator at 60°, the residue is taken up in 500 ml. of methylene chloride; it is washed once each with dilute sodium hydroxide solution, hydrochloric acid, and water; the methylene chloride phase is dried over sodium sulphate and concentrated to dryness by evaporation. 43 g. of crude N-[2-[p-(1-pyrrolyl)-phenyl]-ethyl]-phthalimide are obtained, which, after recrystallization from ether, melts at 191–193°.

Example 24

3.3 g. of N-[2-[p-(1-pyrrolyl)-phenyl]-propyl]-phthalimide are reacted analogously to Example 23. The 1-[p-(2-amino-1-methyl - ethyl)-phenyl]-pyrrole thus obtained is distilled in a bulb tube at 140°/0.1 torr, dissolved in ether and reacted with the calculated amount of hydrogen chloride. The hydrochloride melts at 228–231° (from absolute ethanol).

Analogously can be obtained from 3.5 g. of N-[2-[p-(1-pyrrolyl)-phenyl] - butyl]-phthalimide 1.2 g. (48% of theoretical yield) of 1-[p-[1-aminomethyl)-propyl]-phenyl]-pyrrole-hydrochloride, M.P. 176–181 from absolute ethanol).

The phthalimide derivates required as starting materials are prepared analogously to Example 23 as follows:

(a₁) From 6.0 g. of p-toluenesulphonic acid-[β-methyl-p-(1 - pyrrolyl)-phenethyl]-ester (cf. Example 17(b), 4.7 g. of phthalimide-potassium and 110 ml. dimethyl-formamide 3.5 g. (63% of theoretical yield) of N-[2-[p-(1 - pyrrolyl) - phenyl]-propyl]-phthalimide, M.P. 161–163° (from isopropanol).

(a₂) From 6.2 g. of p-toluenesulphonic acid-[β-ethyl-p-(1-pyrrolyl)-phenethyl]-ester (cf. Example 15(b), 3.6 g. (61% of theoretical yield of N-[2-[p-(1-pyrrolyl)-phenyl]-butyl]-phthalimide, M.P. 92–95° (from isopropanol).

Example 25

0.7 g. of β-nitro-p-(1-pyrrolyl)-styrene, dissolved in 10 ml. of tetrahydrofuran, is added dropwise with stirring and cooling with ice to a suspension of 0.7 g. of lithium aluminum hydride in 40 ml. of tetrahydrofuran. The reaction mixture is refluxed with stirring over night. Then after adding 50 ml. of ether, 10 ml. of water are added. The organic phase is decanted, dried over magnesium sulphate, and concentrated by evaporation in vacuum. The residue (0.5 g.) is dissolved in 2 ml. of ethanol and acidified slightly (pH∼4) with 2 N hydrochloric acid. The crystals which separate are recrystallized from methanol with the addition of activated charcoal. 0.2 g. (26% of theory) of 1-[p-(2-aminoethyl)-phenyl]-pyrrole hydrochloride, M.P. 290–293° (with decomposition) is thus obtained.

The starting material is obtained in the following manner:

(a) A mixture of 4.8 g. of polymeric p-aminobenzaldehyde, 5.4 g. of 2,5-dimethoxy-tetrahydrofuran and 80 ml. of glacial acetic acid are refluxed for one hour. After cooling to about 80°, a large amount of undissolved residue is removed by filtration. The filtrate is concentrated by evaporation in vacuum, and the reaction product is isolated from the black residue by distilling in a bulk tube at 130–140°/0.1 torr. The partially crystalline, orange-colored distillate is recrystallized first from ether and then from isopropanol. The pure p-(1-pyrrolyl)-benzaldehyde melts at 95–97°. Yield: 2.2 g. 32% of theory.

(b) 2.2 g. of p-(1-pyrrolyl)-benzaldehyde, 2.2 ml. of nitromethane, 0.9 g. of ammonium acetate and 9 ml. of glacial acetic acid are refluxed together for one hour. After cooling to 60–70°, the solution is decanted from the precipitated resin and cooled in ice, whereby yellowish brown crystals separate. These are suction filtered, washed with 5 ml. of ether and dried in vacuum. 0.85 g. (30% of theory) of crude β-nitro-p-(1-pyrrolyl)-styrene, M.P. 179–183°, is obtained, which can be used for the following reduction without further purification.

Example 26

11.4 g. of N-[p-(1-pyrrolyl)-phenethyl]-acetamide in a mixture of 200 ml. of ethanol and 50 ml. of 2 N sodium hydroxide solution are refluxed for 15 hours. After removal of the ethanol by distillation under 20 torr, the aqueous concentrated residue is extracted with 200 ml. of chloroform. The chloroform solution is washed with 20 ml. of water, dried over sodium sulphate, and concentrated by evaporation in vacuum. The residue of 7 g. is dissolved in 50 ml. of ethanol, and then 20 ml. of 2 N hydrochloric acid are added. The precipitate which separates is brought into solution by heating. On cooling, 8.2 g. (74% of theory) of 1-[p-(2-aminoethyl)-phenyl]-pyrrole hydrochloride, M.P. 290–293° (decomposition), crystallize.

The starting material can be prepared in the following manner:

(a) 21.0 g. of N-(p-aminophenethy)-acetamide [cf. Helv. Chim. Acta 42, 1730 (1959)], and 15.5 g. of 2,5-dimethoxytetrahydrofuran are refluxed for one hour in 200 ml. of glacial acetic acid. The solvent is removed by distilling at 20 torr and the residue is distilled in a bulb tube at 160–180°/0.01 torr. The crystalline N-[p-(1-pyrrolyl)-phenethyl]-acetamide is recrystallized from ethanol and then melts at 177–178°. Yield: 16.4 g. 61% of theory.

Example 27

A mixture of 2.0 g. of N-methyl-N-[p-(1-pyrrolyl)-phenethyl]-acetamide, 0.8 g. of potassium hydroxide, 2 ml. of water and 50 ml. of butanol is refluxed for 12–15 hours and then concentrated by evaporation at 12 torr. The residue is distributed between 100 ml. of ether and 10 ml. of water. The ether phase is separated, washed with 10 ml. of water, dried over magnesium sulphate, and concentrated by evaporation in vacuum. The residual oil is dissolved in 30 ml. of ether and then 4 ml. of 2.4 N hydrogen chloride solution in ether are added. The crude 1-[p-[2-(methylamino)-ethyl]-phenyl]-pyrrole hydrochloride which precipitates is recrystallized from methanol; the pure substance melts at 254–256°. Yield: 0.8 g., 40% of theory.

The starting material is prepared as follows:

(a) 2.8 g. of N-[p-(1-pyrrolyl)-phenethyl]-acetamide [cf. Example 26(a)], dissolved in 35 ml. of dimethyl formamide, are treated with 0.7 g. of a 50% suspension of sodium hydride in mineral oil, and stirred for 2 hours at 40°. After cooling to 20°, 3.4 g. of methyl iodide are added. The slightly exothermic reaction is completed by stirring for 4–5 hours without additional heating. The excess sodium hydride is decomposed by the addition of 5 ml. of water and neutralized with a few drops of concentrated hydrochloric acid. The residue which is obtained by concentrating by evaporation in vacuum is taken up in 100 ml. of ether and washed with 10 ml. of water. Concentration by evaporating the ether phase which has been dried over magnesium sulphate, yields 3.0 g. of crude product. By recrystallization from ether, 2.0 g. (67% of theory) of pure N-methyl-N-[p-(1-pyrrolyl)-phenethyl]-acetamide, M.P. 77–79°, are obtained.

Example 28

0.6 g. of N-[β-methyl-p-(1-pyrrolyl)-phenethyl]-trifluoroacetamide are dissolved in 10 ml. of ethanol and allowed to stand for two hours at room temperature with 2 ml. of 2-n sodium hydroxide solution. After acidification with 4 ml. of 2-n hydrochloric acid the solution is evaporated under vacuum. The residue is dissolved in 5 ml. of water, extracted with 5 ml. of ether and the aqueous phase is made basic with 2 ml. of concentrated sodium hydroxide. The precipitated base is extracted twice with 20 ml. of ether each time. After evaporation of the ether 0.2 g. of 1-[p-(2-amino-1-methyl-ethyl)-phenyl]-pyrrole are obtained. (50% of theoretical yield), the hydrochloride thereof melts at 228–231° (from absolute ethanol).

Analogously can be obtained, (i) From 2.0 g. of N-methyl-N-[β-methyl-p-(1-pyrrolyl)-phenethyl]-trifluoroacetamide and 6.5 ml. of 2-n sodium hydroxide solution in 30 ml. of ethanol, 1.5 g. (94% of theoretical yield) of crude 1-[p-[2-(methylamino)-1-methyl-ethyl]-phenyl] - pyrrole hydrochloride which melts at 208–212° after recrystallisation from absolute ethanol.

(ii) From 0.9 g. of N-[3-chloro-4-(1-pyrrolyl)-phenethyl]-trifluoroacetamide and 3 ml. of 2 n sodium hydroxide solution in 10 ml. of ethanol, 0.55 g. of 1-[4-(2-aminoethyl)-2-chlorophenyl]-pyrrole hydrochloride, M.P. 203–205° (from isopropanol) (75% of theoretical yield).

The trifluoroacetamides required as starting materials can be prepared as follows:

(a1) 1.4 g. of 1-[p-(2-amino-1-methylethyl)-phenyl]-pyrrole (cf. Example 5) and 0.8 ml. of triethylamine are dissolved in 20 ml. of dioxan and 1.1 ml. of trifluoroacetic acid anhydride are added thereto whilst stirring. The reaction mixture is then heated to boiling for 20 minutes, cooled and evaporated under vacuum. The residue is taken up in ether, washed two times each with 10 ml. of 2-n hydrochloric acid and water dried over sodium sulphate and the ether solution evaporated. After distillation in a bulb tube at 160–180°/0.01 torr 0.6 g. of N-[β-methyl-p-(1-pyrrolyl)-phenethyl] - trifluoroacetamide are obtained, M.P. 145–149° (29% of theoretical yield.)

(a2) 2.3 g. of 1-[p-[1-methyl-2-(methylamino)-ethyl]-phenyl]-pyrrole (cf. Example 5), 2.5 g. of trifluoroacetic acid anhydride and 1.2 ml. of triethylamine are reacted analogously to Example 9, to produce 2.3 g. of N-methyl-N-[β-methyl - p - (1-pyrrolyl)-phenethyl]-trifluoroacetamide as a yellow oil, B.P. 140–150°/0.01 torr (bulb tube) (68% of theoretical yield).

(a3) From 2.0 g. of 1-[4-(2-aminoethyl)-2-chlorophenyl]-pyrrole (cf. Example 7), 3.1 g. of trifluoroacetic acid anhydride and 1.5 g. of triethylamine are obtained, analogously to Example (a1), 1.9 g. of N-[3-chloro-4-(1-pyrrolyl)-phenethyl]-trifluoroacetamide M.P. 105–108° (B.P. 150–160°/0.05 torr) (45% of theoretical yield).

Example 29

2.0 g. of N-methyl-N-[β-methyl-p-(1-pyrrolyl)-phenethyl]-formamide, 1.0 g. of sodium hydroxide, 2 ml. of water and 50 ml. of ethanol are refluxed together for 20–24 hours. After treatment of the reaction mixture analogously to Example 27 1.2 g. of crude 1-[p-[2-(methylamino)-1-methylethyl]-phenyl] - pyrrole-hydrochloride are obtained which melt at 208–212° after recrystallisation (58% of theoretical yield).

The formamide required as starting material can be prepared as follows:

(a) 2.0 g. of N-[β-methyl-p-(1-pyrrolyl)-phenethyl]-formamide (cf. Example 13(a) are reacted for 20 hours analogously to Example 27, in 30 ml. of anhydrous dimethylformamide, with 0.5 g. of sodium hydride suspension (50% in paraffin oil) and 2.8 g. of methyl iodide. Further treatment of the reaction mixture (according to Example 27) yields 2.0 g. of N-methyl-N-[β-methyl-p-(1-pyrrolyl)-phenethyl]-formamide as a yellow oil which is distilled in a bulb tube at 140–160°/0.1 torr (94% of theoretical yield).

Example 30

4.5 g. of N-[β-ethyl-p-(1-pyrrolyl)-phenethyl]-N-methylbenzamide (B.P. 180–190°/0.02 torr) are heated for 15 hours at 120° in an autoclave together with a mixture of 15 ml. of 2-n sodium hydroxide solution and 100 ml. of ethanol. The reaction mixture is cooled, made acidic to Congo red with 2-n hydrochloric acid and evaporated under reduced pressure on a rotary evaporator with a bath temperature of 40°. The residue is partitioned between 20 ml. of water and 50 ml. of ether. The aqueous phase is made alkaline with concentrated sodium hydroxide solution and again extracted with 50 ml. of ether. The combined ether phases are then dried over magnesium sulphate and evaporated. 1.6 g. (53% of theoretical yield) of crude, oily 1-[p-[1-(methylaminomethyl)-propyl]-phenyl]-pyrrole are obtained, the hydrochloride of which melts at 182–185° after recrystalisation from absolute ethanol or isopropanol.

Example 31

15.0 g. of 1-[p-[2-(benzyl-methylamino) - ethyl]-phenyl]-pyrrole are dissolved in 150 ml. of ethanol, then 23 ml. of a 2.5 N solution of hydrogen chloride in ethanol are added, and then hydrogenated in the presence of 1.5 g. of palladium/charcoal (5% Pd). After the calculated amount of hydrogen has been taken up, the reaction ceases. The catalyst is removed by filtration and boiled out with 200 ml. of methanol. The filtrate and the methanol extract are combined and concentrated to dryness by evaporation under 20 torr. The residue obtained, almost colorless crystals, is recrystallized from 100 ml. of methanol. 7.4 g. (60% of theory) of 1-[p-[2-(methylamino)-ethyl]-phenyl]-pyrrole hydrochloride, M.P. 254–256°, are obtained.

The starting material is produced as follows:

(a) 30.0 g. of ethyl [p-(1-pyrrolyl)-phenyl]-acetate and 80 g. of benzyl-methylamine are heated at 180° in an autoclave for 15 hours. The reaction mixture is concentrated in a rotary evaporator under 12 torr in a bath of 90–100°. The residue is distilled in a bulb tube at 190–210°/0.01 torr and yields 28.9 g. (72% of theory) of N-benzyl - N - methyl-2-[p-(1-pyrrolyl)-phenyl]-acetamide as a yellowish oil which can be employed in the following reduction without further purification.

(b) 28.9 g. of N-benzyl-N-methyl-2-[p-(1-pyrrolyl)-phenyl]-acetamide are reduced analogously to Example 1 with 7.2 g. of lithium aluminium hydride in 500 ml. of absolute ether. After recrystallization from ethanol, 16.0 g. of 1-[p-[2-(benzyl-methylamino)-ethyl]-phenyl]-pyrrole, M.P. 48–50°, are obtained.

Example 32

30.0 g. of 1-[p-[2-(dibenzylamino)-ethyl]-phenyl]- pyrrole are dissolved in 1000 ml. of ethanol and hydrogenated with the addition of 3 g. of palladium charcoal (5%), at room temperature and atmospheric pressure until cessation of reaction. The catalyst is filtered off and the filtrate evaporated under reduced pressure. 14 g. of crude 1-[p-(2-aminoethyl)-phenyl]-pyrrole are obtained (90% of theoretical yield), the hydrochloride thereof melts at 290–293° with decomposition (from ethanol/water).

The dibenzylamine derivative required as starting material may be prepared as follows.

(a) 30.0 g. of [p-(1-pyrrolyl)-phenyl]-acetic acid are dissolved in a mixture of 300 ml. of dioxan and 600 ml. of methylene chloride and 21.2 g. of triethylamine are added thereto. 27 g. of pivalic acid chloride are then added dropwise, with cooling at 10° and within 15 minutes. After further stirring 36 g. of dibenzylamine are added dropwise at 5–10° within 10 minutes. The reaction mixture is stirred overnight at room temperature and evaporated at 12 torr. The residue is taken up in 500 ml. of ether and washed with 50 of water, 2-n sodium hydroxide solution, 1-n hydrochloric acid and water. After drying over sodium sulphate the ether is evaporated off under reduced pressure. 57 g. of crude N,N-dibenzyl-[p-(1-pyrrolyl)-phenyl]-acetamide are obtained as an oil which can be reduced without further purification (90% of theoretical yield).

(b) 56 g. of crude N,N-dibenzyl-[p-(1-pyrrolyl)-phenyl]-acetamide are reduced analogously to Example 1 using 12 g. of lithium aluminium hydride in 800 ml. of absolute ether. After recrystallization from ethanol 30.8 g. of 1-[[p-[2-(dibenzylamino)-ethyl]-phenyl]-pyrrole are obtained, M.P. 84–87° (57% of theoretical yield).

Example 33

29.0 g. of 1-[p-[1-methyl-2-(benzyl methylamino)-ethyl]-phenyl]-pyrrole-hydrochloride dissolved in 300 ml. of ethanol are hydrogenated, with the addition of two separate, 3 g. portions of palladium-charcoal (5%), at room temperature and atmospheric pressure until the calculated quantity of hydrogen has been taken up. The catalyst is filtered off, the filtrate evaporated and the residue dissolved in 100 ml. of water. The resulting solution is made slightly basic to pH 8 with 20% sodium hydroxide solution and extracted with ether (ca. 100 ml.). The aqueous phase is then made strongly basic with more concentrated sodium hydroxide solution and extracted with 200 ml. of ether. After evaporation of the ether the residual oil is distilled in a bulb tube (100–120°/0.1 torr) to yield 10.5 g. (57% of theoretical yield) of 1-[p-[1-methyl-2-(methylamino)-ethyl]-phenyl]-pyrrole the hydrochloride of which melts at 208–212° C.

Analogously is obtained from 7.1 g. of 1-[4-[2-(benzyl methylamino)-ethyl]-2-chlorophenyl] - pyrrole - hydrochloride and 2 g. of palladium-charcoal (5%) in 150 ml. of ethanol, 2.2 g. of 1-[2-chloro-4-[2-(methylamino)-ethyl] - phenyl] - pyrrole-hydrochloride M.P. 173–177° (from absolute ethanol), (41% of theoretical yield).

The starting materials may be prepared as follows:

(a1) 21.0 g. of p-(1-pyrrolyl)-hydratropic acid, dissolved in a mixture of 170 ml. dioxan and 400 ml. of methylene chloride are reacted, analogously to Example 32a, with 15.0 g. of triethylamine, 17.9 g. of pivalic acid chloride and 17.0 g. of benzoylmethylamine. 35 g. of crude N-benzyl-N-methyl-p-(1-pyrrolyl)-hydratropamide are obtained as an oil which can be reduced, without further purification, using lithium aluminium hydride.

(a2) Analogously is obtained from 15.0 g. of [3-chloro-4-(1-pyrrolyl)-phenyl]-acetic acid, 9.9 g. of triethylamine, 12.1 g. of pivalic acid chloride and 11.6 g. of benzyl-methylamine, 25 g. of the crude amide which is distilled in a bulb tube. The fraction which boils at 180–200°/0.01 torr produces oily N-benzyl-N-methyl-[3-chloro-4-(1-pyrrolyl)-phenyl]-acetamide (16.4 g., 76% of theoretical yield).

(b1) 35.0 g. of N-benzyl-N-methyl-p-(1-pyrrolyl)-hydratropamide are reduced, analogously to Example 1, with 12.5 g. of lithium aluminium hydride in 1500 ml. of absolute ether. The fraction boiling at 150–160°/0.1 in a bulb tube produces 1-[p-[1-methyl-2-(benzylmethylamino)-ethyl]-phenyl]-pyrrole (26.0 g. 76% of theoretical yield). The oily hydrochloride, prepared using the calculated amount of ethereal hydrogen chloride solution, is used, without further purification, as starting material for the debenzylation reaction.

(b2) 16.4 g. of N-benzyl-N-methyl-[3-chloro-4-(1-pyrrolyl)-phenyl]-acetamide are reduced for 20 hours, analogously to Example 1, with 1.9 g. of lithium aluminium hydride in 300 ml. of absolute ether. After recrystallization from isopropanol 8.2 g. of 1-[4-[2-(benzylmethylamino)-ethyl]-2-chlorophenyl]-pyrrole-hydrochloride are obtained, M.P. 189–196° (47% of theoretical yield).

Example 34

6.4 g. of 1-[p-[1-benzylmethylamino-(methyl)-propyl]-phenyl]-pyrrole are dissolved in 100 ml. of ethanol and hydrogenated, with the addition of 10 ml. of 2-n hydrochloric acid and using 1 g. of palladium-charcoal until 1 molecular equivalent of hydrogen is taken up, whereupon the catalyst is filtered off and washed through with 50 ml. of warm methanol. The combined filtrates are evaporated under reduced pressure and the residue recrystallised from isopropanol. 3.1 g. of 1-[p-[1-(methyl-aminomethyl)-propyl]-phenyl]-pyrrole-hydrochloride are obtained M.P. 188–185° (58% of theoretical).

The starting material may be prepared as follows:

11.0 g. p-toluenesulphonic acid-[β-ethyl-p-(1-pyrrolyl)-phenethyl]-ester. (cf. Example 11b) and 20 ml. N-methyl-benzylamine in 100 ml. of dimethylformamide are heated for 20 hours in a bath at 60–70°. The solvent is then evaporated under reduced pressure, the residue taken up in 180 ml. 2-n hydrochloric acid and extracted with 50 ml. ether. The acidic, aqueous phase is separated, made alkaline with concentrated sodium hydroxide solution and extracted with 200 ml. of methylenechloride. The methyl-enechloride solution is dried over sodium sulphate, evaporated and distilled in a bulb tube. After the initial distillation of excess methylbenzylamine at 120°/10 torr the 1-[p - [1 - (benzylmethylamino-methyl)-propyl]-phenyl]-pyrrole distills at 140–160°/0.005 torr (8.5 g. 89%, of theoretical yield).

The following may be prepared analogously:

(a) From 4.8 g. of 1-[p-[2-(benzylamino)-1-methyl-ethyl]-phenyl]-pyrrole, dissolved in 80 ml. ethanol, debenzylated over palladium-charcoal (5%) with the addition of 8.2 ml. of 2-n hydrochloric acid, 1.6 g. of 1-[p-(2-amino - 1 - methylethyl) - phenyl]-pyrrole-hydrochloride, M.P. 228–231° (from absolute ethanol) (43% of theoretical yield).

The starting material is prepared from 10 g. of p-toluenesulphonic acid - [β - methyl-p-(1-pyrrolyl)-phenethyl]-ester and 16 ml. of benzylamine (B.P. 150–160°/0.01 torr).

Example 35

6.7 g. of p - amino - N,N - dimethyl-phenethylamine [Kindler et al., Arch. Pharmazie 283, 184 (1950)] are dissolved in 80 ml. of glacial acetic acid and refluxed for one hour with 5.5 g. of 2,5-dimethoxy-tetrahydrofuran. The reaction mixture is concentrated by evaporation at 12 torr. Distillation of the black residue in a bulb tube at 140–150°/0.02 torr yields 5.4 g. of 1-[p-[2-(dimethyl-amino)-ethyl]-phenyl]-pyrrole as an almost colorless oil which partially crystallizes. It is dissolved in 50 ml. of ether and converted with 7.5 ml. of 3.3 N ethereal hydrogen chloride solution into the hydrochloride (4.8 g., 46% of theory). After recrystallization from methanol, the 1-[p - [2 - dimethylamino)-ethyl]-phenyl]-pyrrole hydrochloride melts at 228–232°.

In an analogous manner, using 7.7 g. of p-amino-N,N-diethyl-phenethylamine, there are obtained 3.8 g. (38% of theory) of 1-[p-[2-(diethylamino)-ethyl]-phenyl]-pyrrole which is converted according to Example 1 into the fumarate, M.P. 123–125°.

Example 36

3.3 g. of p-amino-N,β-dimethyl-phenethylamine dissolved in 35 ml. of acetic acid, are refluxed for 1 hour with the addition of 2.7 g. of 2,5-dimethoxytetrahydrofuran and the reaction mixture evaporated under reduced pressure. The black residue is partitioned between 100 ml. of ether and 20 ml. of of 2-n sodium hydroxide solution. The ether phase is separated, washed with 10 ml. water and dried over sodium sulphate. The oil which remains after evaporation of the ether is distilled in a bulb tube at 120°/0.01 torr to give 2.4 g. of 1-[p-[1-methyl-2-(methylamino)-ethyl]-phenyl]-pyrrole (55% of theoretical yield). The hydrochloride melts at 208–212°.

Analogously is obtained using 2.5 g. of β-ethyl-p-amino-N-methyl-phenethylamine, 2.5 g. of 1-[p-[1-(methylamino-methyl)-propyl]-phenyl]-pyrrole (54% of theoretical yield) (M.P. of the hydrochloride 182.185°).

The starting materials may be prepared as follows:

(a1) p-Aminohydratropic acid [Liebig's Ann. d. ch. 621, 34 (1959)] is esterified in the usual way with absolute ethanol to give the ethyl ester, B.P. 110–115°/0.01 torr. 10 g. of p-aminohydratropic acid ethyl ester and 20 g. of methylamine are heated in an autoclave for 10 hours at 180°. After evaporating off the excess methylamine the reaction mixture is distilled in a bulb tube at 150–160°/0.2 torr. 7.9 g. of p-amino-N-methyl-hydratropamide are obtained (86% of theoretical yield).

(a2) Analogously is obtained, from 10.0 g. of 2-(p-aminophenyl)-butyric acid ethyl ester, 7.5 g. of 2-(p-aminophenyl)-N-methyl-butyramide as a viscous oil.

(b1) 7.9 g. of p-amino-N-methyl-hydratropamide dissolved in 80 ml. of absolute tetrahydrofuran, are added dropwise, with stirring and ice cooling, to 100 ml. of a 2.1 molar solution of diborane in absolute tetrahydrofuran and left standing for three days at room temperature and with the exclusion of moisture. The reaction mixture is then handled as in Example 4 to give 5.0 g. of p-amino-N,β-dimethylphenethylamine, which distills at 120–130°/0.1 torr in a bulb tube (69% of theoretical yield).

(b2) Analogously to Example 6, is obtained from 7.4 g. of 2-(p-aminophenyl)-N-methyl-butyramide, 5.2 g. of β-ethyl-p-amino-N-methyl-phenethylamine (B.P. 135–140°/0.1 torr in bulb tube ) (75% of theoretical yield).

Example 37

Analogously to Example 36, 3.0 g. of p-amino-N-methylphenethylamine and 2.7 g. of 2,5-dimethoxytetrahydrofuran in 30 ml. of glacial acetic acid are reacted and worked up to give 1.7 g. of 1-[p-[2-(methylamino)-ethyl]-phenyl]-pyrrole, B.P. 120–130°/0.1 torr (41% of theoretical yield). The hydrochloride melts at 254–256°.

The starting material is prepared as follows:

(a) 11.5 g. of p-nitrophenethyl bromide are dissolved in a mixture of 20 ml. of dioxan and 100 ml. of absolute ethanol and allowed to stand for 6 days at room temperature with 25 ml. of benzylmethylamine. The reaction mixture is then thoroughly evaporated initially at 20 torr and subsequently at 0.1 torr and 80–100° bath temperature. The residue is partitioned between 150 ml. of ether and 30 ml. of 2-n sodium hydroxide solution and the ether phase washed with 10 ml. of water, dried over sodium sulphate and evaporated. The residue is distilled at 140–150°/0.05 torr to give 12.9 g. of N-benzyl-N-methyl - p - nitrophenethylamine. (95% of theoretical yield).

(b) 11.7 g. of N-benzyl-N-methyl - p - nitro-phenethyl-amine are dissolved in 150 ml. of ethanol, 21 ml. of 2-n-hydrochloric acid are added and the mixture is hydrogenated, with the addition of 2 g. of palladium-charcoal (5%), at room temperature and atmospheric pressure until cessation of reaction. (4 mol equiv. taken up). The catalyst is filtered off, the solvent evaporated and the base liberated with concentrated sodium hydroxide solution and extracted with ether. The crude base is distilled in a bulb tube at 100–110°/0.2 torr to give 4.8 g. of p-amino-N-methyl-phenethylamine, M.P. 84–88° (74% of theoretical yield).

Example 38

Analogously to Example 35 is obtained from 2.3 g. of β-ethyl-p-amino-N,N-dimethyl-phenethylamine, 1.6 g. of 2,5-dimethoxytetrahydrofuran and 30 ml. of glacial acetic acid, 2.1 g. of 1-[p-[1-(dimethylaminomethyl)-propyl]-phenyl]-pyrrole the acid fumarate of which melts at 137–140° (72% of theoretical yield).

The starting material is prepared as follows:

(a) 27.0 g. of 2-(p-aminophenyl)-butyric acid ethyl ester and 80 g. of dimethylamine give, analogously to Example 36a, 12.9 g. of 2-(p-aminophenyl)-N,N-dimethyl-butyramide, M.P. 88–95° (48% of theoretical yield).

(b) Reduction of 12.9 g. of the substituted butyramide with 100 ml. of a 2-n diborane solution in tetrahydrofuran analogously to Example 36b, gives 7.7 g. of β-ethyl-p-amino-N,N-dimethylphenethylamine, B.P. 120–125°/0.1 torr in a bulb tube (64% of theoretical yield).

Example 39

A solution of 4.3 g. of 2.5-dichloro-tetrahydrofuran [H. Gross, Chem. Ber. 95, 83 (1962)] in 20 ml. of chloroform is added dropwise with stirring to a solution of 4.9 g. of p-amino-N,N-dimethyl-phenethylamine and 6 ml. of pyridine in 40 ml. of chloroform. The reaction mixture is then allowed to stand for 2–3 hours, shaken with 30 ml. of 4-n sodium hydroxide solution and the chloroform phase is dried over potassium carbonate. The residue obtained after evaporation of the chloroform is distilled in a bulb tube at 140°/0.02 torr to give 2.1 g. of 1-[p-[2-(dimethylamino)-ethyl]-phenyl] - pyrrole the hydrochloride of which melts at 228–232° (from isopropanol) (32% of theoretical yield).

Example 40

3.3 g. of p-amino-N,β-dimethyl-phenethylamine (cf. Example 36b), 3.8 g. of 2,5-diacetoxy-tetrahydrofuran and 40 ml. of glacial acetic acid are refluxed for 1 hour and worked up according to Example 36 to give 2.1 g. of 1-[p-[1-methyl-2-(methylamino)ethyl] - phenyl] - pyrrole the hydrochloride of which melts at 208–212° (from isopropanol) (48% of theoretical yield).

Analogously is obtained using 3.3 g. of p-amino-N,N-dimethyl-phenethylamine, 2.4 g. of 1-[p-[2-(dimethylamino) - ethyl] - phenyl] - pyrrole the hydrochloride of which melts at 228–232° (55% of theoretical yield).

Example 41

3.8 g. of 2.5-diacetoxy-tetrahydrofuran are stirred at room temperature with 20 ml. of 0.1-n hydrochloric acid (ca. 20 minutes) until a homogenous solution of succinic-dialdehyde is obtained. After the addition of a solution of 3.3 g. of p-amino-N,N-dimethyl-phenethylamine and 1.2 g. of glacial acetic acid in 10 ml. of dioxan and 5 ml. of water the reaction mixture is refluxed for 1 hour. The residue obtained after evaporation under reduced pressure is partitioned between 100 ml. of ether and 20 ml. of 2-n sodium hydroxide. The ether phase is separated, dried over sodium sulphate and distilled in a bulb tube at 140°/0.02 torr to give 1.9 g. of 1-[p-[2-(dimethylamino)-ethyl]-phenyl]-pyrrole the hydrochloride of which melts at 228–232°. (44% of theoretical yield.)

Example 42

A solution of 1.8 g. of ethyl iodide in 10 ml. of dimethyl formamide is added dropwise with stirring during one hour to a solution of 2.0 g. of 1-[p-[2-(methylamino)-ethyl]-phenyl]-pyrrole in 20 ml. of dimethyl formamide, in which 2 g. of potassium carbonate have been suspended. The reaction mixture is stirred over night, then concentrated by evaporation at 12 torr, and distributed between 10 ml. of water and 100 ml. of ether. The organic phase is separated, washed with 10 ml. of water, dried over magnesium sulphate, and concentrated by evaporation. The oil obtained (1.5 g.) is dissolved in 20 ml. of ether and then 2.0 ml. of 3.3-n hydrogen chloride solution in ether are added. The 1-[p-[2-(ethyl-methylamino)ethyl]-phenyl]-pyrrole hydrochloride which precipitates is suction filtered and, after recrystallization from isopropanol, melts at 165–169°. Yield 0.8 g., 30% of theory.

The production of the starting material is described in Example 16.

Example 43

2.5 g. of 1-[p-[1-aminomethyl)-propyl]-phenyl]-pyrrole-hydrochloride (cf. Example 2) are stirred for 15 minutes with 7 g. of potassium carbonate in 35 ml. of dimethyl formamide in order to liberate the free base. 2.8 g. of methyliodide are then added and the reaction mixture is stirred for 20 hours at room temperature. The undissolved salt is filtered off, the filtrate evaporated and the residue partitioned between 50 ml. of ether and 30 ml. of water. After evaporation of the ether 1.7 g. (70% of theoretical yield) of crude 1-[p-[1-(dimethylaminomethyl)-propyl]-phenyl]-pyrrole are obtained which are converted into the acid fumarate by addition of the equivalent quantity of fumaric acid. After twice recrystallising from isopropanol or ethanol the fumarate melts at 137–140°.

Example 44

4.5 g. of 1-[p-(2-aminoethyl)-phenyl]-pyrrole-hydrochloride are stirred for 30 minutes together with 14 g. of potassium carbonate in 50 ml. of dimethylformamide. 1.2 ml. of methyl iodide are then added dropwise and with cooling and after 3 hours of stirring at room temperature a further 1.2 ml. of methyliodide are added in the same manner. The mixture is then stirred for a further 3 hours, evaporated under reduced pressure and the residue is partitioned between 20 ml. of water and 50 ml. of ether. The ether phase is then made slightly acidic with a 3-n ethereal hydrogen chloride solution and the resulting crystals are repeatedly recrystallised from absolute ethanol. 0.65 g. of 1-[p-[2-(dimethylamino)-ethyl]-phenyl] - pyrrole-hydrochloride are obtained M.P. 228–232° (12% of theoretical yield).

What is claimed is:

1. A compound of the formula

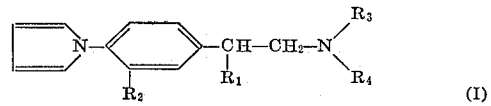

wherein
$R_1$ is hydrogen, methyl or ethyl;
$R_2$ is hydrogen or chloro, and
$R_3$ and $R_4$ independently of each other are hydrogen methyl or ethyl;
or a pharmaceutically acceptable acid addition salt thereof.

2. A compound according to claim 1 which is 1-[p-(2-aminoethyl)-phenyl]-pyrrole.

3. A compound according to claim 1 which is 1-[4-(2-aminoethyl)-2-chlorophenyl]-pyrrole.

4. A compound according to claim 1 which is 1-[p-)2-amino-1-methylethyl)-phenyl]-pyrrole.

5. A compound according to claim 1 which is 1-[p-[1-(methylamino-methyl)-propyl]-phenyl]-pyrrole.

6. A compound according to claim 1 which is 1-[p-[2-(dimethylamino)-ethyl]-phenyl]-pyrrole.

7. A compound according to claim 1 which is 1-[p-[1-methyl-2-(methylamino)-ethyl]-phenyl]-pyrrole.

References Cited

UNITED STATES PATENTS 2,986,564    5/1961    Rips et al. _____ 260—326.9 X

ALEX MAZEL, Primary Examiner

J. A. NARCAVAGE, Assistant Examiner

U.S. Cl. X.R.

260—326 N, 326.3, 326.5 R, 326.62; 424—232, 274